United States Patent
Talebzadeh et al.

(10) Patent No.: US 12,355,388 B2
(45) Date of Patent: Jul. 8, 2025

(54) RADIANT ENERGY SPECTRUM CONVERTER

(71) Applicants: Nima Talebzadeh, North York (CA); Paul O'Brien, Schomberg (CA)

(72) Inventors: Nima Talebzadeh, North York (CA); Paul O'Brien, Schomberg (CA)

( * ) Notice: Subject to any disclaimer, the term of this patent is extended or adjusted under 35 U.S.C. 154(b) by 100 days.

(21) Appl. No.: 18/014,276

(22) PCT Filed: Jul. 9, 2021

(86) PCT No.: PCT/CA2021/050949
§ 371 (c)(1),
(2) Date: Jan. 3, 2023

(87) PCT Pub. No.: WO2022/006682
PCT Pub. Date: Jan. 13, 2022

(65) Prior Publication Data
US 2023/0291345 A1    Sep. 14, 2023

Related U.S. Application Data

(60) Provisional application No. 63/050,513, filed on Jul. 10, 2020.

(51) Int. Cl.
*H02S 10/30* (2014.01)
*H02S 40/22* (2014.01)

(52) U.S. Cl.
CPC .............. *H02S 10/30* (2014.12); *H02S 40/22* (2014.12)

(58) Field of Classification Search
CPC ........ H02S 10/30; H02S 40/22; H10F 77/488; H10F 77/45; H10F 77/484; H10F 19/80; G02B 19/0042; H01L 31/055
See application file for complete search history.

(56) References Cited

U.S. PATENT DOCUMENTS

2003/0213514 A1* 11/2003 Ortabasi ................. H02S 40/44
136/246
2004/0120153 A1* 6/2004 Pate ................... G02B 17/0605
362/558
(Continued)

FOREIGN PATENT DOCUMENTS

CN        105356837 A  *  2/2016
RU          2670360 C1     10/2018

OTHER PUBLICATIONS

CN-105356837-A English machine translation (Year: 2016).*
(Continued)

*Primary Examiner* — Andrew J Golden
(74) *Attorney, Agent, or Firm* — Osha Bergman Watanabe & Burton LLP

(57) ABSTRACT

A radiant energy spectrum converter apparatus comprising: a first ellipsoid and a second ellipsoid overlapping the first ellipsoid to form an internal cavity, the first ellipsoid comprising a first upper half and a first lower half and the second ellipsoid comprising a second upper half and a second lower half; a port for permitting entry of incident radiation into the apparatus; a receiver for absorbing selected portions of the incident radiation and emitting secondary radiation; an internal cavity having a reflective surface for reflecting the secondary radiation such that the reflected secondary radiation from the first ellipsoid and the second ellipsoid converges on a first focal point; and wherein the receiver is located at the first focal point.

10 Claims, 18 Drawing Sheets

(56) References Cited

U.S. PATENT DOCUMENTS

2012/0024359 A1\* 2/2012 Hou ........................ H02S 10/30
  136/253
2015/0101652 A1 4/2015 Dhar
2018/0120483 A1 5/2018 Shimura et al.

OTHER PUBLICATIONS

Fong, Chun Hui, "Study of The Tandem Solar Cell," University Tunku Abdul Rahman, Sep. 2011 (113 pages).
International Search Report issued in corresponding International Application No. PCT/CA2021/050949, dated Aug. 17, 2021 (3 pages).
Written Opinion issued in corresponding International Application No. PCT/CA2021/050949, dated Aug. 17, 2021 (5 pages).

\* cited by examiner

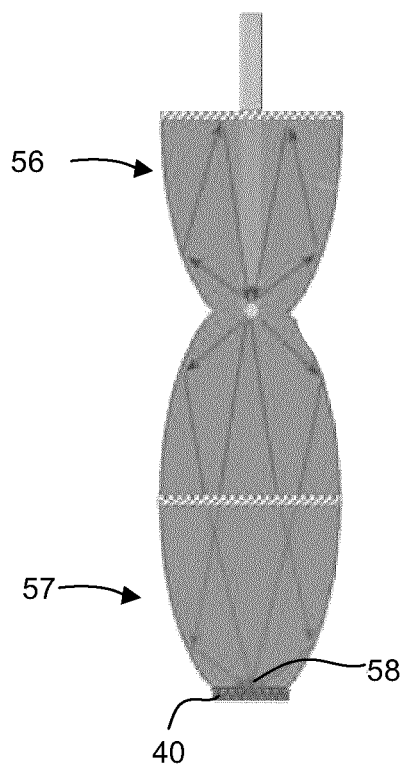
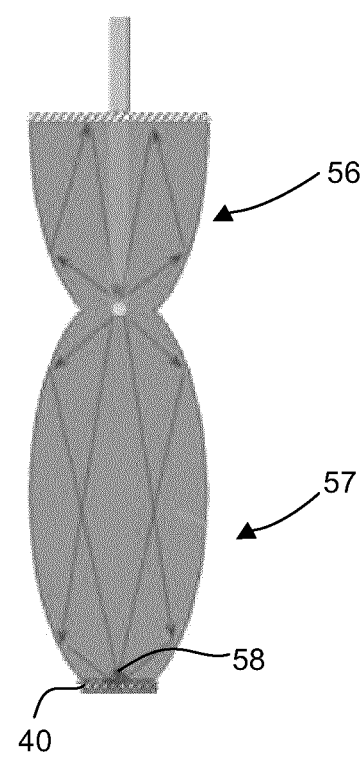
Figure 7a        Figure 7b
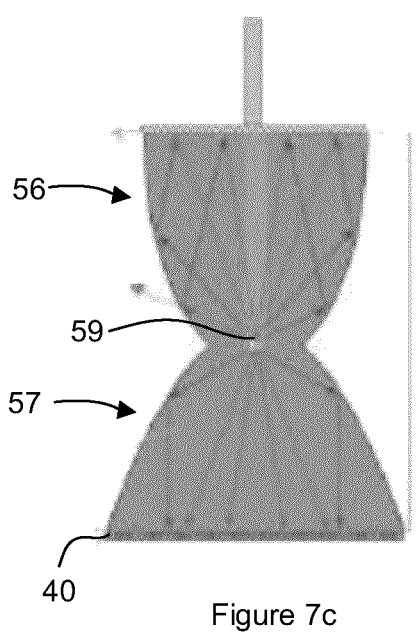
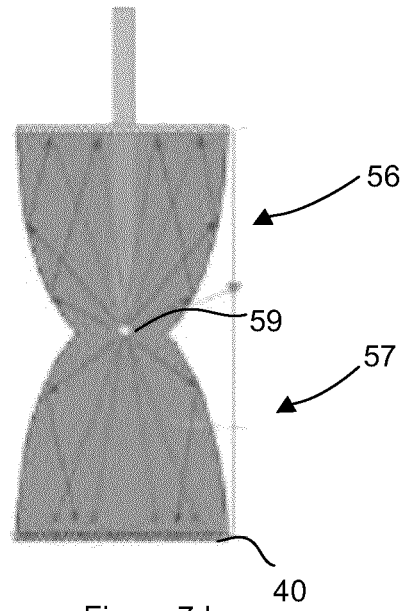
Figure 7c        Figure 7d

RADIANT ENERGY SPECTRUM CONVERTER

FIELD

The present disclosure relates generally to optical cavities for radiant thermal energy conversion and harvesting.

BACKGROUND

In most techniques of radiant energy harvesting, including solar energy harvesting, only a fraction of the incoming photon energy can be put to use in the targeted energy conversion process. The main loss mechanisms in thermophotovoltaic (TPV) systems are often due to spectral inefficiencies and directional issues associated with photons towards a target. For example, a large fraction of the radiation emitted from an emitter may not carry sufficient energy to generate current in a photovoltaic (PV) cell. High energy photons can generate electric current in the PV cell, however, they also increase the temperature of the PV cell, which reduces the efficiency of the PV cell. Intricate cooling systems are often used to cool the PV cell within TPV systems. Another loss mechanism in luminescent solar concentrators is emission losses, which occur when light is emitted within the escape cone by luminophores within the luminescent solar concentrator. Light emitted within the escape cone propagates in a direction less than the critical angle for total internal reflection (TIR) to occur and is refracted outside the waveguide rather than being internally reflected towards a PV cell. Directional issues of photons contribute to losses since a large portion of the radiation emitted from the absorbing surface is not directed towards photovoltaic (PV) cells. The view factor, which defines the fraction of emitted photons that are incident onto the PV cell, is often is less than one, as some of the emitted photons are lost to the surroundings or absorbed in other components of the TPV system before reaching the PV cell.

To date, research directed towards reducing emission losses from the absorbing surface in TPV systems has investigated the use of optical cavities to reflect a portion of the emitted radiation back to the absorbing surface. However, these optical cavities have not been designed to optimally focus radiation emitted from the absorbing surface onto PV cells. Furthermore, research directed towards reducing emission losses in luminescent solar concentrators has investigated the effects of coating wavelength-selective mirrors on the surface of luminescent solar concentrator panels, or aligning the luminophores within the luminescent solar concentrators. In one prior art method a Cassegrain solar concentrator comprising a large parabolic mirror is used for focusing radiant energy onto the solar spectrum converter. The large parabolic mirror focuses solar radiation onto a second smaller mirror, or a convex lens, which directs a radiant energy radiation beam into an entrance port at the top of the solar spectrum converter, as shown in FIG. 1. Spectral-splitting luminescent solar concentrators, which have been developed since the late 1970s, are particularly attractive because they are relatively inexpensive, lightweight and amenable to large scale production with design flexibility in shape, size and spectral transparency. However, due to their intrinsic loss mechanisms and modest efficiency, luminescent solar concentrators have yet to be extensively commercialized.

Other approaches have been considered to address these loss mechanisms including: selective emitters, optical filters, back-surface reflectors, selective absorber, high area ratio between the PV cell and the emitter, optimizing the area ratio between the emitter and the absorber, having a waveguide between the emitter and PV cell (light-pipe base), using a thermal lens (such as a photonic crystal or an optical cavity to concentrate or collimate emitted radiation towards the PV cell), and considering different types of PV cells with low bandgaps. In addition, solar TPV systems (SPTV) are typically required to achieve high levels of solar concentration (>2000×), however, complex optical setups are necessary to achieve such levels, resulting in high optical losses from the concentrators.

SUMMARY

In one of its aspects, there is provided a radiant energy converter apparatus comprising:
  a first ellipsoid and a second ellipsoid overlapping the first ellipsoid to form an internal cavity, the first ellipsoid comprising a first upper half and a first lower half and the second ellipsoid comprising a second upper half and a second lower half;
  a port for permitting entry of incident radiation into the apparatus;
  a receiver for absorbing selected portions of the incident radiation and emitting secondary radiation;
  an internal cavity having a reflective surface for reflecting the secondary radiation such that the reflected secondary radiation from the first ellipsoid and the second ellipsoid converges on a first focal point; and
  wherein the receiver is located at the first focal point.

In another of its aspects, there is provided a radiant energy converter comprising:
  an optical cavity for focusing radiation at a first focal point;
  an emitter operable to emit light energy having a predefined spectral energy distribution; and
  directional means adapted to direct emitted light to a second focal point.

In another of its aspects, there is provided a radiant energy spectrum converter comprising:
  a spheroid optical cavity comprising;
  an emitter within the optical cavity, wherein the emitter is operable to emit photons; and
  a photovoltaic cell to receive the photons for generating an electric current in the photovoltaic cell; and
  wherein the emitter is located at one end of the spheroid optical cavity and the photovoltaic cell is located at another end of the spheroid optical cavity.

In another of its aspects, there is provided a radiant energy spectrum converter comprising:
  a prolate hemi-spheroid optical cavity;
  a prolate spheroid optical cavity combined with the prolate hemi-spheroid optical cavity at a meeting point;
  an emitter located at the meeting, wherein the emitter is operable to emit photons; and
  a photovoltaic cell to receive the photons for generating an electric current in the photovoltaic cell; and wherein the photovoltaic cell is located at one end of the prolate spheroid optical cavity.

In another of its aspects, there is provided a radiant energy spectrum converter comprising:
  an oblate hemi-spheroid optical cavity;
  a prolate spheroid optical cavity combined with the oblate hemi-spheroid optical cavity at a meeting point;
  an emitter located at the meeting, wherein the emitter is operable to emit photons; and a photovoltaic cell to receive the photons for generating an electric current in the photovoltaic cell; and wherein the photovoltaic cell is located at one end of the prolate spheroid optical cavity.

In yet another of its aspects, there is provided a radiant energy spectrum converter (RESC) that comprises a receiver that absorbs radiant energy radiation and uses this energy to radiate light, and comprises a class of optical cavities in the form of oblate and prolate spheroids. The radiant energy spectrum converter may absorb all of the incident radiation or selected spectral regions, allowing spectral regions that are not absorbed to be transmitted through the radiant energy converter, exiting through a second port at the bottom of the structure. The radiant thermal energy absorbed by the radiant energy converter may be used to provide power for one application while the portion of radiant energy that is transmitted may be used for a second application.

As noted above, one principal loss mechanism for solar receivers in solar-thermal systems is radiation from the absorbing surface. Advantageously, the radiant energy spectrum converter minimizes radiation loss from the absorbing surface by using directional selectivity in which radiation is effectively suppressed by using an overlapped hemi-ellipsoid structure and an ellipsoid structure with a shared focal point. When used in a TPV application, the apparatus described in this disclosure has the following advantages: smaller size of the PV cell; reduced emission loss; increased distance between the hot surface and PV cell by increasing the major axis of the ellipsoidal structure, and thermal energy recycling of radiation emitted from the absorber, among others.

In addition, the luminescent solar spectrum splitter partitions the solar irradiance into photosynthetically active radiation (PAR) and photosynthetically inactive radiation (non-PAR). The luminescent solar spectrum splitter can be designed to separate non-PAR from the solar irradiance and direct it towards PV cells with a predetermined geometric gain factor, concentration factor, emission losses and optical efficiency.

Accordingly, emission losses are minimized by shaping the matrix that hosts the luminophores to drastically reduce the size of the escape cone such that it is almost eliminated. For example, when the solar spectrum splitter is comprised of a solid transparent medium the shape of its ellipsoidal or parabolic surface can be designed such that all the light radiated from the emitter undergoes total internal reflection and does not escape to the medium surrounding the solar spectrum splitter, other than through the entrance or the exit port. More specifically, the focusing power of non-imaging optical solar concentrators is combined with the spectral splitting properties of luminescent solar concentrators resulting in a spectral-splitting solar concentrator that partitions the solar irradiance into PAR and non-PAR spectra to simultaneously provide light energy suited for enabling photosynthetic processes and powering PV cells, respectively.

BRIEF DESCRIPTION OF THE DRAWINGS

The detailed description refers to the drawings briefly described below:

FIG. 7a shows a thermophotovoltaic conversion system;

FIG. 7b shows another thermophotovoltaic conversion system;

FIG. 7c shows another thermophotovoltaic conversion system;

FIG. 7d shows yet another thermophotovoltaic conversion system;

FIG. 9b shows a spectral irradiance graph corresponding to the stacked structures of FIG. 9a;

FIG. 10b shows a spectral irradiance graph corresponding to the series stacked structures of FIG. 10a;

FIGS. 20b-e show the photon fate for the prolate hemispheroid-prolate spheroid shared focal point RESC structure of FIG. 20a;

DETAILED DESCRIPTION

Figure 1:
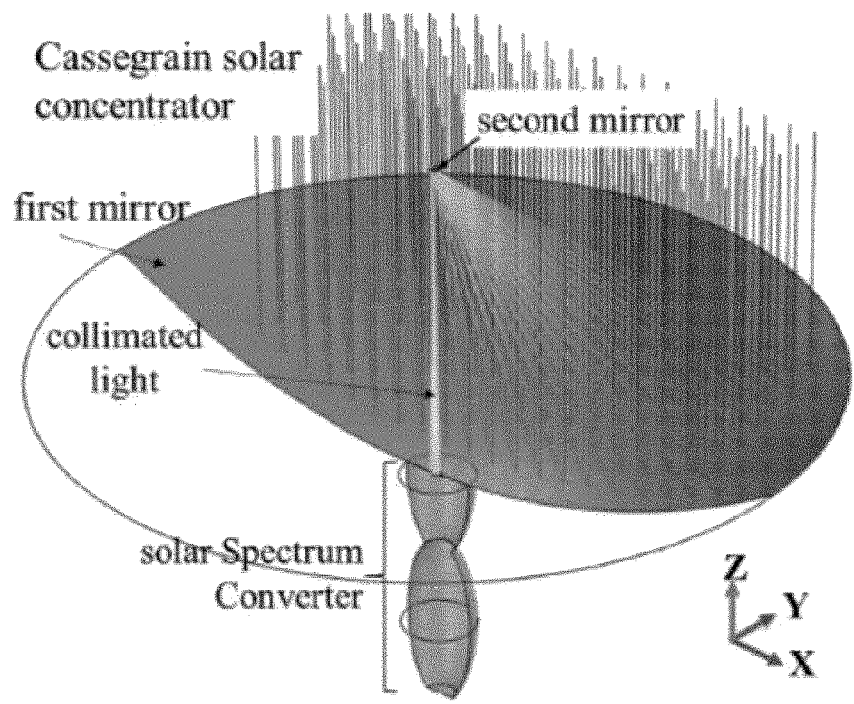
FIG. 1 shows a prior art Cassegrain solar concentrator wherein the concentrated light is collimated prior to the exit port.

Various embodiments are discussed in detail below. While specific implementations are discussed, it should be understood that this is done for illustration purposes only. A person skilled in the relevant art will recognize that other components and configurations may be used without parting from the spirit and scope of the disclosure. Like reference numerals are used to designate like parts in the accompanying drawings.

The detailed description provided below in connection with the appended drawings is intended as a description of the present examples and is not intended to represent the only forms in which the present example may be constructed or used. However, the same or equivalent functions and sequences may be accomplished by different examples.

Figure 2A:
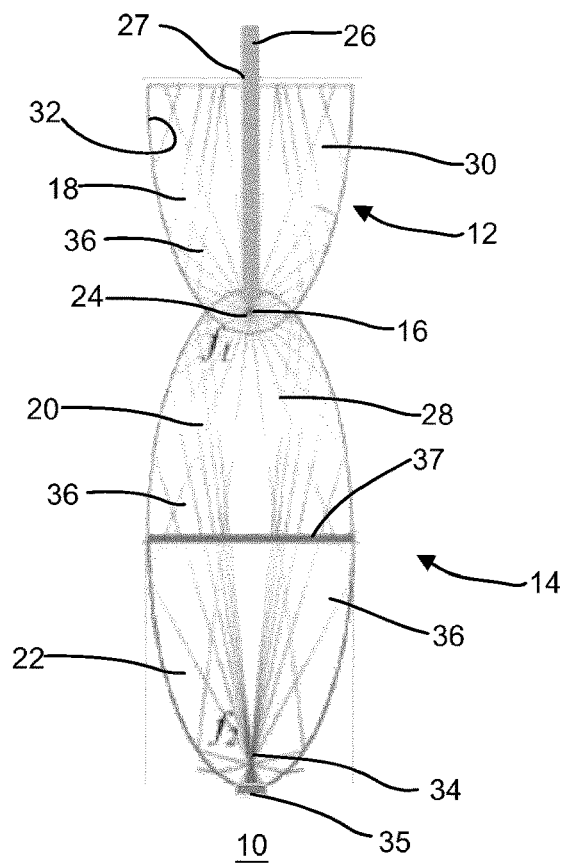
FIG. 2a shows a radiant energy converter in use in a thermophotovoltaic application.

With reference now to the drawings, FIG. 2a shows a radiant energy converter apparatus 10. The radiant energy spectrum converter apparatus 10 may be designed for a number of applications and/or implementations, in which the incident solar radiation is focused onto a receiver that is located at a focal point that is shared by two structures that make up the body of the concentrated radiant energy converter apparatus 10.

In one implementation, the radiant energy converter apparatus 10 functions as a thermophotovoltaic device, wherein the incident thermal radiation is absorbed by a receiver which emits electromagnetic waves with a suitable spectral distribution onto a photovoltaic cell within an optical cavity of the radiant energy converter apparatus 10, as will be described below. Accordingly, the emitted light is focused onto the photovoltaic cell within a cavity of a radiant energy converter apparatus 10 to generate electricity. As such, in this particular implementation, the radiant energy converter apparatus 10 comprises two overlapping ellipsoids, that is upper ellipsoid structure 12 and lower ellipsoid structure 14, that share a common focal point, $f_1$ 16. As can be seen in FIG. 2a, only the bottom half 18 of the upper ellipsoid structure 12 is included in the apparatus 10, while the full ellipsoid structure, that is upper half 20 and lower half 22, of the lower ellipsoid structure 14 is included in the apparatus 10. A receiver 24, located at the shared focal point 16 of the hemi-ellipsoid structure 12 and the ellipsoid structure 14, comprises a volume of material with radiative properties that approximates a black body having the characteristics of high absorptivity and high emissivity. As an example, the volume of material may be in the order of $mm^3$. Concentrated thermal radiation 26 enters the apparatus 10 via port 27 and strikes the receiver 24 which causes the receiver 24 to emit radiation 28, 30. The internal surface 32 of the apparatus 10 is coated with a highly reflective film. The radiation 28 emitted from the receiver 24 in the downwards direction is focused onto a photovoltaic cell 35 located at, or in close proximity to, the focal point $f_2$ 34 to generate electricity. Meanwhile, the radiation 30 that is emitted from the receiver 24 in the upwards direction is focused back onto the receiver 24 after reflecting off the internal surface 32 of the radiant energy converter apparatus 10 (with the exception of the radiation that exits through the entrance port 27) where it can be reabsorbed to maintain high receiver temperatures. The interior cavity 35 of the radiant energy converter apparatus 10 may be kept under vacuum to minimize absorption losses that may otherwise occur if the internal medium included some material, that inevitably would absorb some of the light propagating through it. A high transparency window may be placed at the entrance port 27. The bottom of the radiant energy converter apparatus 10 may include an exit port for permitting egress of the radiation that is not absorbed by the receiver 24, as will be described below.

For the thermophotovoltaic application shown in FIG. 2a, the radiant energy spectrum converter apparatus 10 has the unique feature that the light emitted from the receiver 24 is focused onto the photovoltaic cell 35 (or back onto the receiver 24). This configuration minimizes thermal losses from the receiver 24, which also functions as the emitter. Another advantage of this configuration is that the radiation from the emitter 24 can be focused onto a relatively small photovoltaic cell 35, which results in high concentration ratios.

As shown in FIG. 2a, a selective mirror 37 may be integrated into the radiant energy concentrator apparatus 10 in a plane that bisects the lower ellipsoid structure 14. The selective mirror 37 transmits light with sufficient energy to power the photovoltaic cell 35 while reflecting radiation that does not have sufficient energy to power the photovoltaic cell 35, thereby reducing radiative heat losses from the receiver/emitter 24. The selective mirror 37 may be in the form of a Bragg-reflector, or may be in the form of a thin optical film coating on a transparent substrate such as glass. The thin optical film may be comprised of thin transparent conducting oxide films and thin metallic films.

Figure 2B:
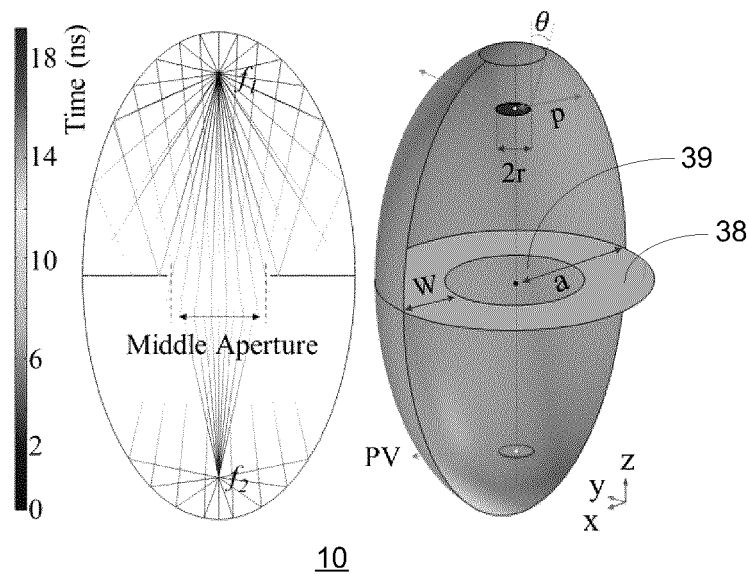
FIG. 2b shows a radiant energy converter in use in a thermophotovoltaic application using a specular reflector along the minor axis (a) of a prolate spheroid.

In another exemplary implementation, as shown in FIG. 2b, the selective mirror 37 in FIG. 2a may be replaced with a planar reflector 38 with an aperture 39 that allows some radiation emitted from $f_1$ to be focused onto $f_2$, while the reflector returns the remaining portion of radiation emitted from $f_1$ back to $f_1$. The dimensions of the aperture 39 may be set to control the portion of radiation emitted from $f_1$ that is incident onto $f_2$ and the amount reflected to $f_1$. The planar reflector may be metallic or coated with a highly reflective metal.

In another implementation, the receiver 24 itself may be designed in the form of a photonic crystal. In this case the receiver 24's emission and absorption spectrum may be designed to differ from that of a blackbody; and the emissivity may be increased for radiation that has sufficient energy to power the photovoltaic cell 35, and may be reduced for the long wavelength spectral region that has lower energy and is not able to power the photovoltaic cell 35 located at focal point $f_2$ 34. In this spectral region it is preferable for the receiver 24 not to emit radiation in order to prevent heat losses.

In another implementation, the concentrated radiant energy converter apparatus 10 shown in FIGS. 2a, 2b may be fabricated from a transparent solid material rather than a shelled structure with a refractive index higher than the outer medium. For example, the radiant energy spectrum converter apparatus 10 may be fabricated from polymethyl methacrylate (PMMA) or glass, and the curvature of the ellipsoids 12, 14 may be designed to reflect the light emitted from the receiver 24 via total internal reflection (TIR). Thus, the light emitted from the receiver 24 does not escape the solid material and is instead either focused onto the second focal point $f_2$ of the ellipse or directed back towards the receiver 24 itself.

Figure 3:
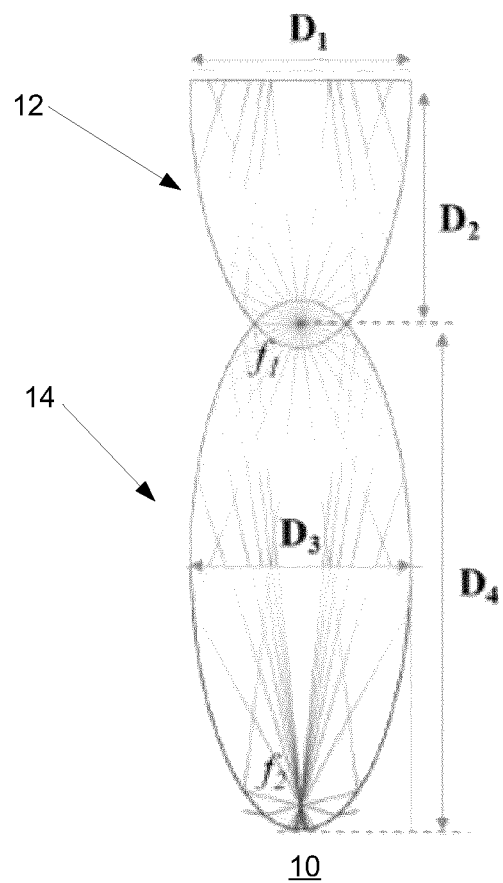
FIG. 3 shows various degrees of freedom of the radiant energy converter.

Looking at FIG. 3, it can be seen that the radiant energy spectrum converter apparatus 10 comprises a number of degrees of freedom, such as $D_1$: the width of the upper ellipsoid 12; $D_2$: the length of the upper ellipsoid 12; $D_3$: the width of the lower ellipsoid 14; and $D_4$: the length of the lower ellipsoid 14.

Figure 4A:
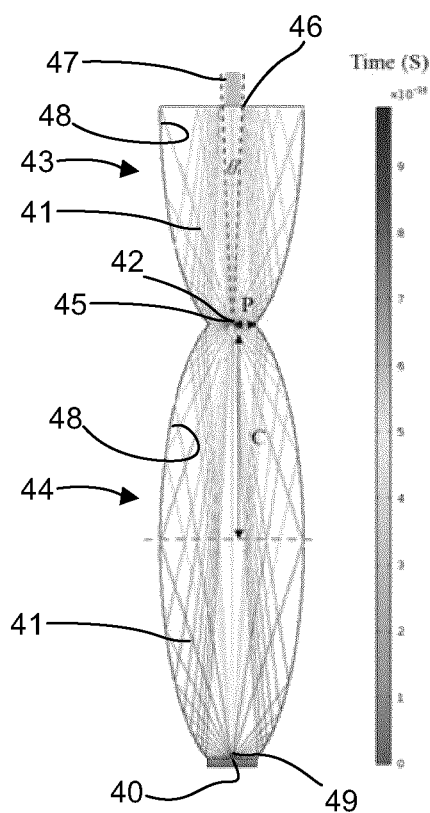
FIG. 4a shows a disc-shaped blackbody absorber located at a shared focal point.

In more detail, as shown in FIG. 4a, radiant energy spectrum converter apparatus 10 functions as an optical cavity for a photovoltaic device 40. The structure 10 comprises an optical cavity 41 enveloping an absorber 42, such as a blackbody. The optical cavity 41 is formed of a hemi-ellipsoid structure 43 and an ellipsoid structure 44, which have a common, shared focal point 45 where the blackbody absorber 42 is located. An aperture 46 on top of the cavity 41 with an opening angle of θ, allows thermal radiation 47 to enter the cavity 41. Thus, the absorber 42 is subjected to a concentrated beam of thermal radiation 47 formed using lenses or a Cassegrain concentrator in conjunction with collimators, for example. Accordingly, the absorber 42 is heated to a high temperature and is caused to emit radiation. Subsequently, the emitted radiation is reflected from an internal surface 48 of the optical cavity 41 and is directed towards the photovoltaic cell 40, or ultimately back to the absorber 42 itself to minimize radiation losses and maintain a high absorber temperature. In one example, the blackbody absorber 42 is located at the shared focal point 45, and may be disc-shaped with an upper circular surface area of 10 cm$^2$. For the elliptic shape of the shell 10 it is assumed that c/a=0.95 (where c is the distance between the center point of the ellipse and either of its focal points and a is the semi-major axis of the ellipse), and the ratio of P (distance from the shared focal point to the surface of the ellipsoidal components of the structure) to the black body 42 radius (~1.7 cm) is 10. The size of the radiant energy spectrum splitter apparatus 10 can be easily adjusted given that all dimensions are scalable based on these parameters.

Accordingly, directional selectivity may be employed in order to achieve high absorber temperatures. That is, the absorber 42 receives the incident thermal energy from one direction (e.g. a cone with a small solid angle) and emits radiant energy in all directions. Ideally, all the energy emitted from the absorber 42 is either directed towards the photovoltaic cell 40 or returned to the absorber 42 itself, with the exception of the radiation that is emitted towards and lost through the aperture 46, therefore it is desirable for the aperture 46 to be as small as possible to minimize emission losses.

In one exemplary implementation, the cavity 41 is formed of parabolic shells, or parabolic surfaces when the radiant energy converter apparatus comprises a solid transparent material. Furthermore, as discussed above with reference to FIG. 3, the several degrees of freedom in designing the optical cavity 41, such as semi-minor axis and semi-major axis for each of the elliptical or parabolic components may be manipulated in order to improve the spectral and directional properties and the effective emittance of the whole structure 10. Generally, the effective emittance is defined as the emittance the absorber 42 would need to have in the absence of the cavity 41 to have equivalent radiative losses as compared to the case when the cavity 41 is present. When the blackbody 42 is placed at the shared focal point 45 of the structure 10, radiation losses can be reduced by almost 50% and the effective emittance can be reduced by almost a factor of 2. In other words, for a blackbody absorber 42 with an emissivity of 1, the effective emissivity will be reduced to about 0.5 when the absorber 42 is placed at the shared focal point 45.

The effective emittance of the absorber 42 can be considered as one figure of merit for the radiant energy spectrum converter apparatus 10, which functions as an optical cavity 41 for the case of the thermophotovoltaic application. A second figure of merit for the structure 10 is the amount of radiation emitted by the absorber 42 that reaches the photovoltaic cell 40.

Figure 4B:
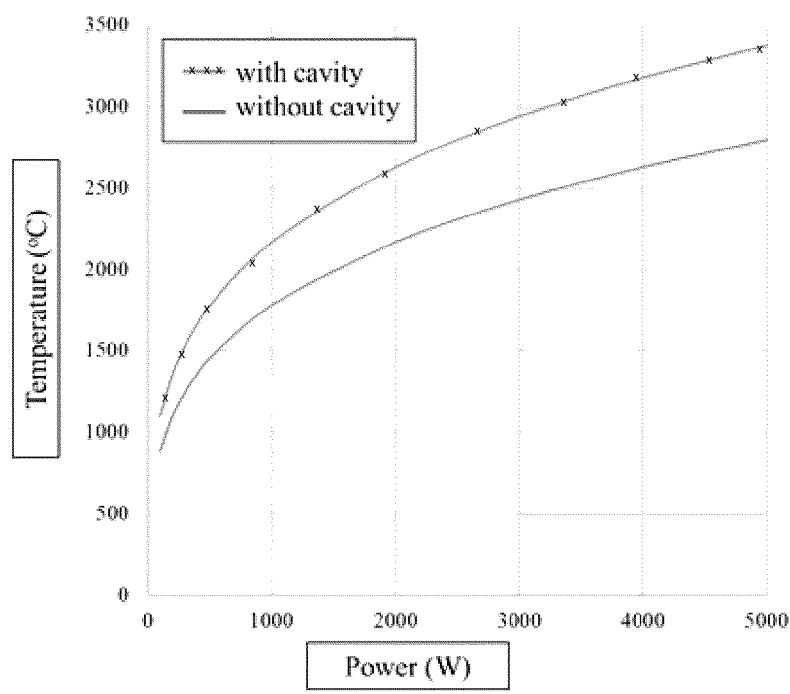
FIG. 4b shows the temperature of the absorber in the presence and the absence of an optical cavity plotted as a function of the power of the incident thermal radiation.
Figure 5:
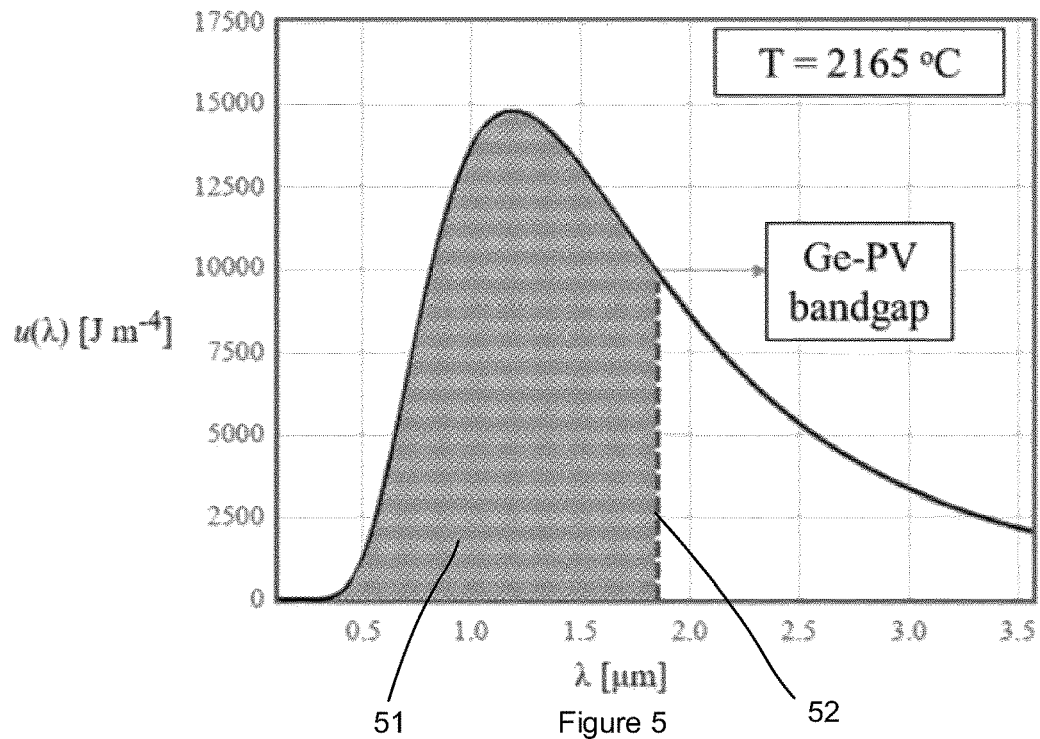
FIG. 5 shows the radiation spectrum emitted from a blackbody that is at a temperature of 2165° C.

FIG. 4b shows the temperature of a blackbody absorber 42, plotted as a function of the power of the incident radiation, in the presence of an optical cavity 41 and in the absence of the optical cavity 41 with an effective emissivity equal to that of the radiant energy spectrum splitter apparatus 10 shown in FIG. 4a. The effective emissivity of the radiant energy spectrum splitter in FIG. 4a is about 0.5. Referring to FIG. 5, there is shown a radiation spectrum emitted from the blackbody 42 that is at a temperature of 2165° C., which is the temperature of the emitter 42 for the case considered with reference to FIG. 4a when the power of the incoming light is 1000 W. For example, for a germanium (Ge)-based photovoltaic cell with a band gap of 0.67 eV located at, or adjacent to, a second focal point 49 of the ellipse 44, the shaded area 51 shows the radiation from the emitter 42 that can be harvested and converted to electricity within the Ge-based cell and the region to the right side of the dashed line 52 can be redirected to the absorber 42 to be recycled and thus reduce thermal losses.

Figure 6A:
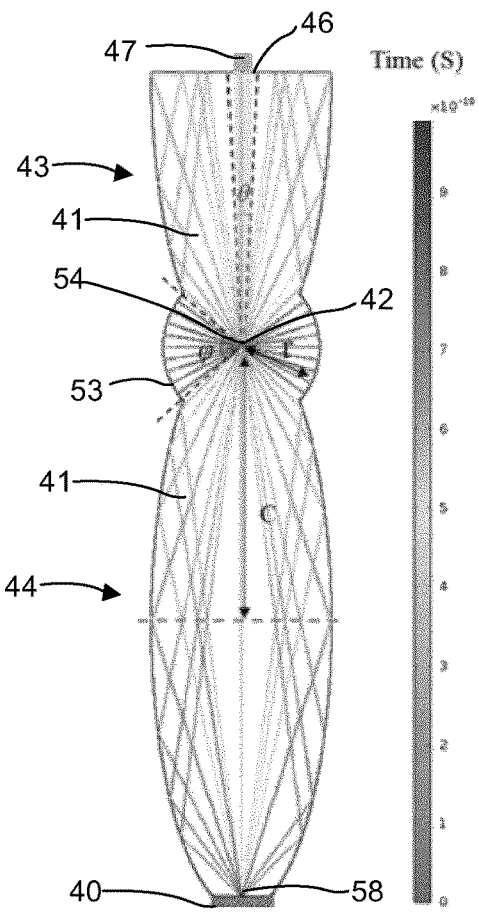
FIG. 6a shows a modified structure comprising two ellipses and a circle with the same shared focal points.

The effective emissivity of the optical cavity 41 shown in FIG. 4a may be tailored by combining a circle 53 with the radiant energy spectrum splitter apparatus 10. As shown in FIG. 6a, the circle 53 can be centered at the focal point 54 where the absorber 42 is disposed within the optical cavity 41. The radius of the circle 53 adds an extra degree of freedom in the configuration of the optical cavity 41, and can be used to tune the effective emissivity of the cavity 41. Increasing the radius of the circle 53 increases the fraction of radiation emitted from the absorber 42 that is reflected back to itself, and thereby reduces the effective emissivity of the cavity 41. Thus, increasing the radius of the circle 53 results in an increase of the blackbody temperature, a decrease in emission loss, a reduction in the effective emissivity, and increases the amount of radiation emitted from the absorber 42 that is recycled. Higher absorber temperatures may be desirable to tune the emission spectrum from the absorber 42 to better match the optimal input radiation spectra 46 for generating power in the photovoltaic cell 40 located at the second focal point 58. In other exemplary implementations the photovoltaic cell 40 may be made from materials other than germanium, such as silicon.

Figure 6B:
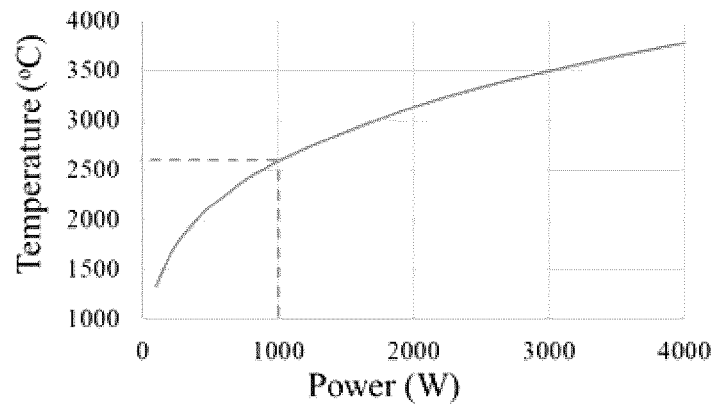
FIG. 6b shows the temperature of the absorber in presence of an optical cavity plotted as a function of the power of the incident solar radiation for a modified structure.
Figure 6C:
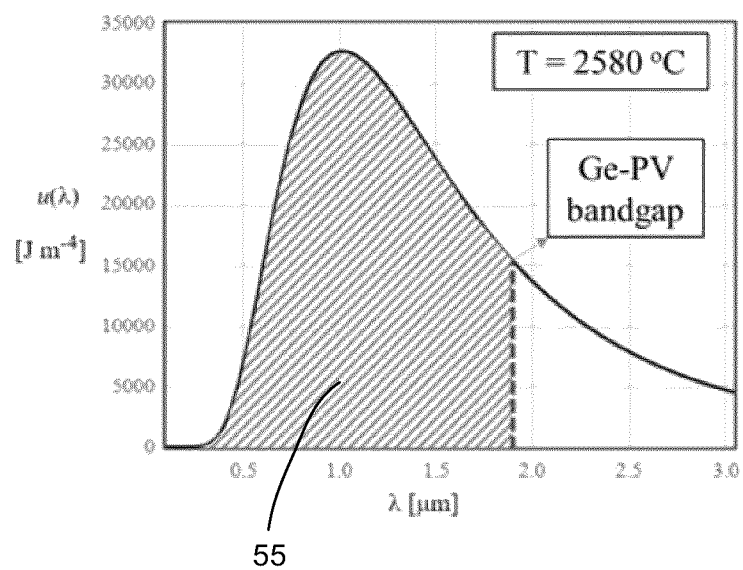
FIG. 6c shows a blackbody radiation profile for temperature of 2580° C.

The overlapped circle 53 and two ellipsoid structures 43, 44 have the same shared focal point 54. As shown in FIG. 6a, the parameters and variables of the structure 10, that is circle radius (r) and circle angle ($\varphi$) further manipulate the effective emissivity of the formed optical cavity 41. In this example the circle angle is $\varphi=85°$ and the value of the effective emissivity has been reduced to 0.265. Considering the same flux of incident solar energy as previous example of FIG. 5a (1000 W) the temperature of the absorber/emitter 42 is increased to 2580° C., as can be seen in FIG. 6b. FIG. 6c shows the emission spectra corresponding to a blackbody 42 that is at a temperature (T) of 2580° C., and the shaded region 55 under the curve shows the radiation that can be used to power the Ge-based photovoltaic cell 40 located at the second focal point 58 of the ellipse. Noticeably, the fraction of the radiation emitted from the absorber/emitter 42 that is incident onto the Ge-based photovoltaic cell 40 that can be used to power this Ge-based photovoltaic cell 40 has increased in comparison to the case when the circular shape centered at the focal point was absent (e.g. the exemplary implementation described with reference to FIG. 4a).

Now referring to FIGS. 7a-7d, it can be seen that the radiant energy spectrum converter apparatus 10 may include a variety of forms each comprising different combinations of the upper structures 56 and lower structures 57, having elliptical or parabolic shapes. In implementations where the photovoltaic cell 40 is located at the second focal point 58 of the ellipses 56, 57 then high concentration ratios can be attained. On the other hand, in implementations where the lower portion of the radiant energy spectrum splitter apparatus 10 is made from a parabolic structure 57, as shown in FIGS. 7c and 7d with a shared focal point 59, emitted light can be collected by a photovoltaic cell 40 located at the bottom side of the radiant energy spectrum splitter apparatus 10. For cases where the lower portion of the radiant energy spectrum splitter is a parabolic structure 57, as shown in FIGS. 7c and 7d, an exit port may be located at the center of the bottom side of the structure to allow light not absorbed by the emitter/receiver to exit the structure. Also, for cases when the lower portion of the radiant energy spectrum splitter 10 is an elliptical structure 57 and the absorber is a selective absorber, such as a material comprised of luminophores, an exit port may be located at the center of the bottom side of the structure to allow light not absorbed by the emitter/receiver to exit the structure.

Figure 8:
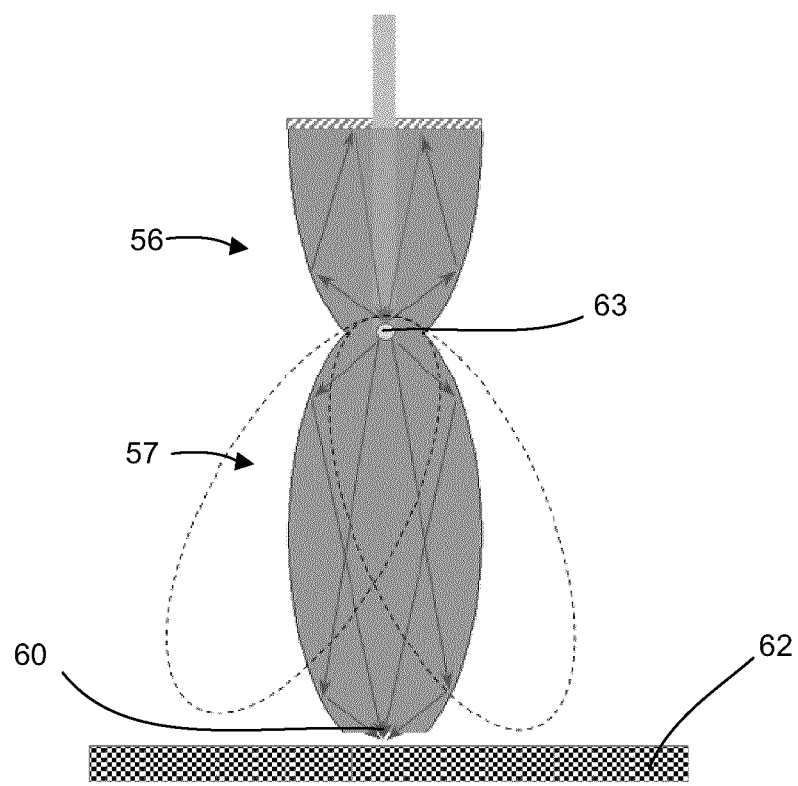
FIG. 8 shows another exemplary embodiment of the radiant energy converter wherein the lower ellipsoidal component of the radiant energy converter can be rotated about its upper focal point, such that the position of its lower focal point can be moved and controlled.

In another implementation, the radiant energy spectrum converter apparatus 10 may be used to direct the emitted light energy onto a point 60 that can easily be scanned across a surface 62, as shown in FIG. 8. For example, the lower elliptical part 57 of the structure 10 may be swung about the upper focal point $f_1$, 63 such that the position of the second focal point $f_2$ 60, where the emitted light is focused, is altered. Furthermore, by making the lower ellipse 57 from a flexible material, the depth of second focal point $f_2$ 60 can be altered by increasing and decreasing the width of the flexible elliptical structure 10. In this implementation, the radiant energy spectrum splitter apparatus 10 may be used to "write" or "print" with an intense radiant energy radiation beam that can provide for localized heating. Such an implementation may be useful for material processing using renewable energy or in applications where an intense thermal energy source is required (e.g. when non-concentrated energy does not provide sufficient heat). Alternatively, the concentrated solar radiation beam can be focused on the surface 62 with minimal motion, using minimal amounts of energy, as the elliptical structures 56, 57 of the radiant energy spectrum converter apparatus 10 are relatively small and light-weight. For example, the size of the elliptical structures 56, 57 may be in the order of a few centimeters.

In yet another implementation, luminophores or luminescent materials such as luminescent dyes or nanoparticles may be used as a receiver 24. Accordingly, the radiant energy spectrum converter apparatus 10 functions as an efficient spectral splitting luminescent solar concentrator with low emission losses and high geometrical gain. For example, in agrivoltaic applications, when the solar spectrum splitter 10 is made from a solid transparent material, such as PMMA or glass, the receiver 24 may be fabricated by impregnating the region at the upper focal point with luminescent dye. In this case, for example, the receiver 24 may be comprised of about 99% glass or PMMA and about 1% luminescent dye by volume. The luminophores may be designed to absorb green light (which is used minimally by crops) while blue and red light is transmitted through an exit port to enable photosynthesis in underlying crops or algae.

Figure 9A:
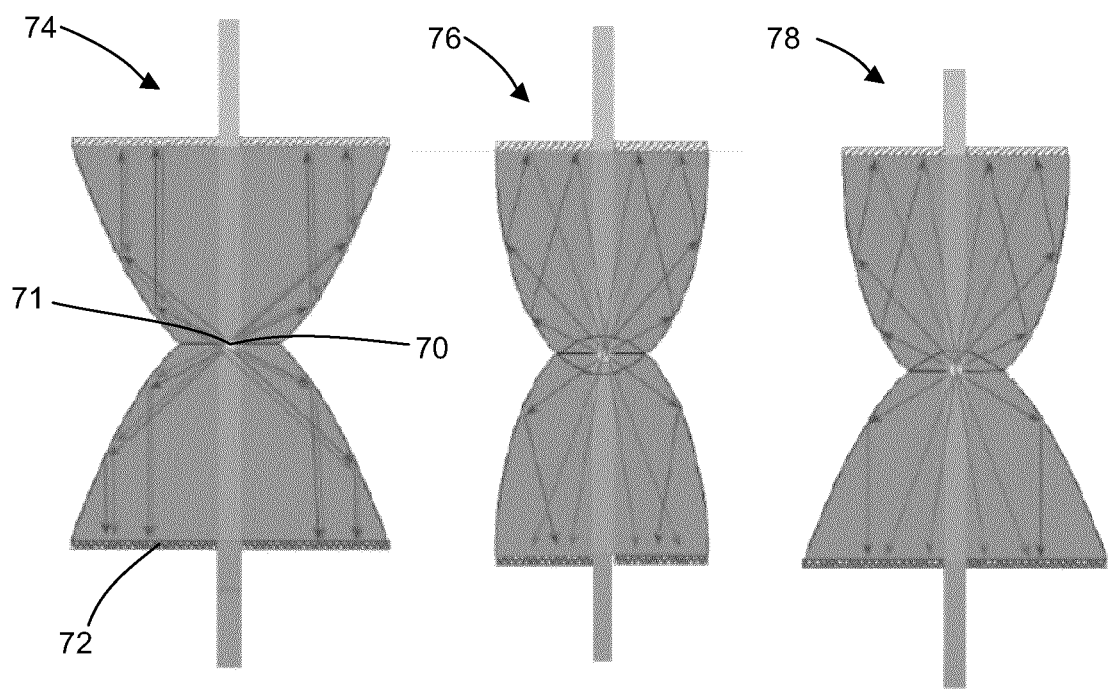
FIG. 9a shows solar spectrum splitter structures arranged to sequentially absorb, separate, and harvest different portions of the solar spectrum.
Figure 9B:
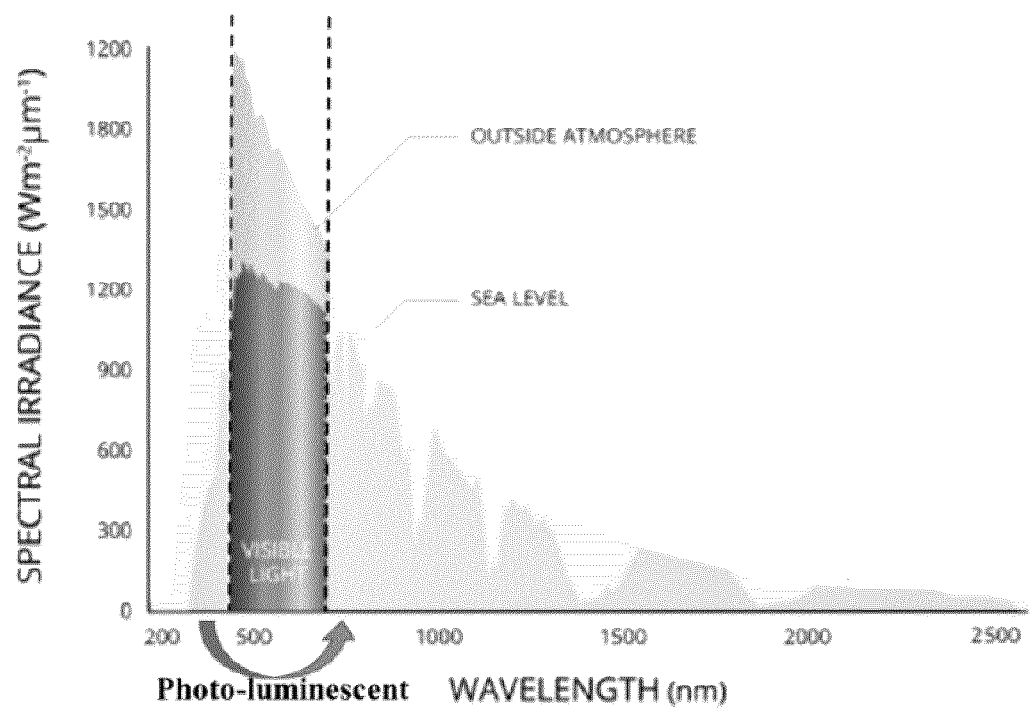

For example, the concentrated photo-luminescent dye 70 is placed at the focal point 71, as shown in FIG. 9a. In one example, absorbed green light excites dyes 70 at the focal point 71, which in turn radiate light that is collected by photovoltaic cells 72 located at the bottom surface of the radiant energy spectrum splitter apparatus 10. The structures 74, 76, 78 presented in FIG. 9a can be stacked to sequentially absorb, separate, and harvest different portions of the solar spectrum. A spectral irradiance graph corresponding to the stacked structures of FIG. 9a is shown in FIG. 9b. This implementation may be useful in photo-bioreactors that use a portion of the solar irradiance to generate electricity, or for hybrid lighting systems, in which visible light is transmitted through the radiant energy spectrum splitter apparatus 10 while infrared light or UV light is absorbed by the receiver 24.

Figure 10A:
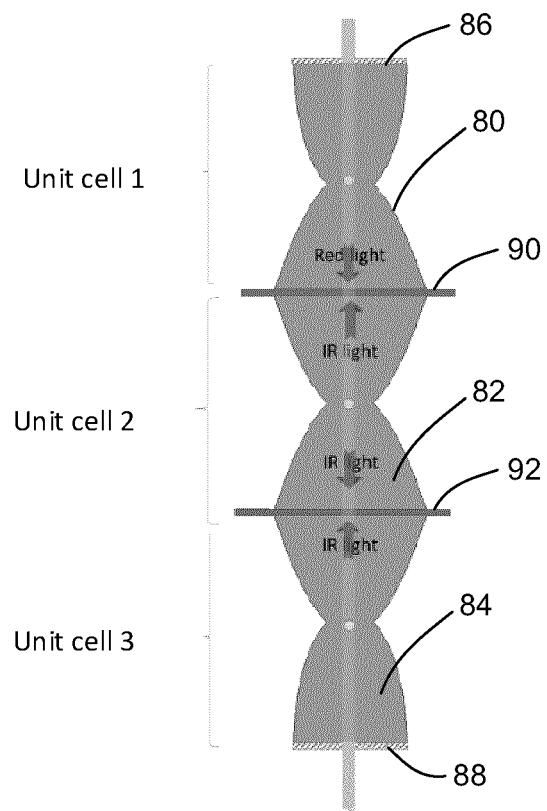
FIG. 10a shows solar spectrum splitter structures with entrance and exit ports that are stacked to sequentially absorb, separate, and harvest different portions of the solar spectrum.
Figure 10B:
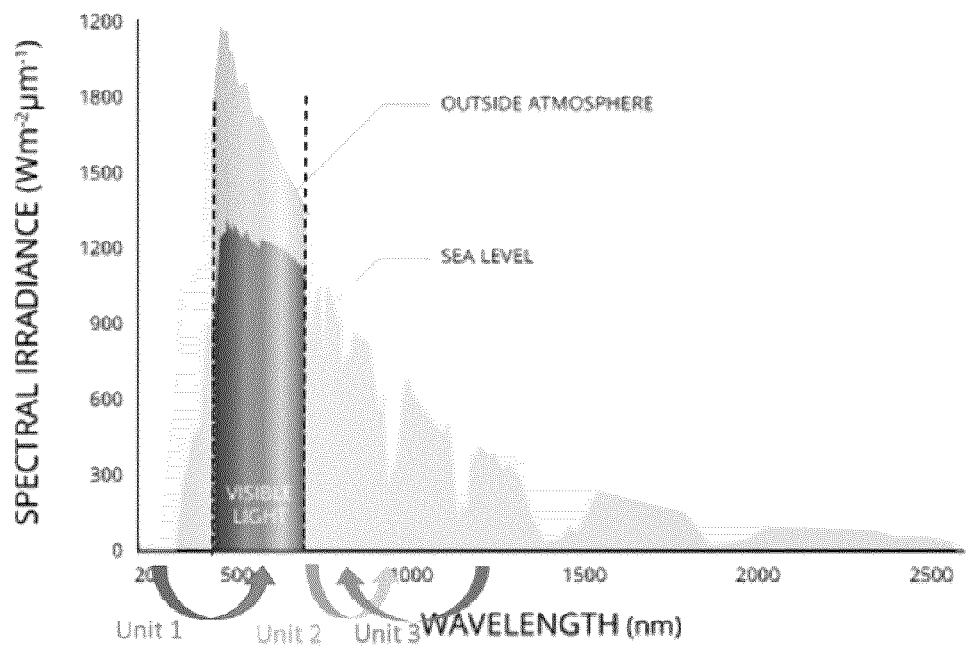

As can be seen in FIG. 10a, three units 80, 82, 84 of radiant energy spectrum splitters 10 are stacked to absorb, separate and harvest the ultra-violet (UV), near-infrared (NIR) and mid-infrared (MIR) range of the solar spectrum, sequentially. Mirrors 86, 88 are placed at the uppermost and bottommost surfaces of units 80 and 84, respectively, and photovoltaic cell 90 is located between the individual radiant energy spectrum converter units 80 and 82; and photovoltaic cell 92 is located between the individual radiant energy spectrum converter units 82 and 84. A spectral irradiance graph corresponding to the stacked structures 80, 82, 84 of FIG. 10a is shown in FIG. 10b.

In another implementation, luminescent solar spectrum splitter apparatus 10 that partitions the solar irradiance into photosynthetically active radiation (PAR) and photosynthetically inactive radiation (non-PAR). The luminescent solar spectrum splitter apparatus 10 may be adapted to separate non-PAR from the solar irradiance and direct the solar irradiance towards photovoltaic cells with a predetermined geometric gain factor, concentration factor, emission losses and optical efficiency.

The solar spectrum converter apparatus 10, particularly the receiver 24, may be designed to emit light energy with a desirable spectral distribution. The desired spectral distribution will depend on the application. For example, the radiated spectrum may be comparable to that of a blackbody at an elevated temperature (e.g. 1000 K to 3500 K), or it may peak over a narrow spectral range. Accordingly, the configuration of the solar spectrum converter apparatus 10 also allows for control over the directional properties of the emitted light. That is, the emitted light may be focused to a point, or it may be emitted from the solar spectrum converter apparatus 10 as a parallel beam. Furthermore, the light emitted from the receiver 24 may be harvested within the solar spectrum converter apparatus 10 itself.

Figure 11A:
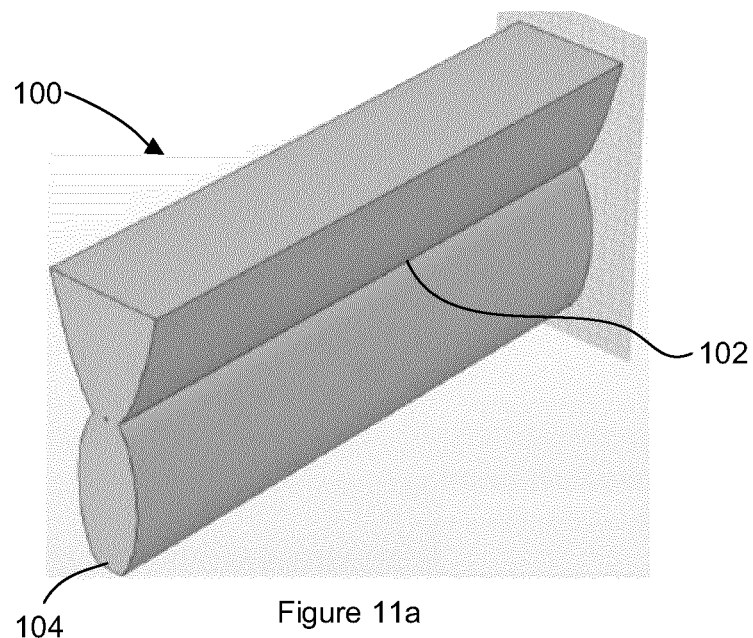
FIG. 11a shows a linear 3D solar spectrum splitter.
Figure 11B:
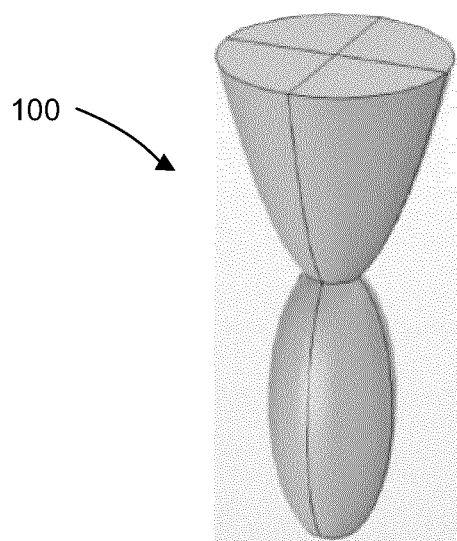
FIG. 11b shows a rotation-based 3D solar energy spectrum splitter.

In another implementation, the shape of the two-dimensional radiant energy spectrum splitter shown in FIG. 2a may be extended in the direction normal to the image to form a longitudinal radiant energy spectrum splitter 100, as shown in FIG. 11a. In such a configuration, the focal points 16, 34 in FIG. 2a become focal lines 102, 104. As an example, the longitudinal solar spectrum splitter apparatus 100 of FIG. 11a may be used to heat a fluid in a pipe located along the focal line 102 or 104 with solar energy; the advantage being reduced thermal losses. As mentioned previously discussed, the receiver may absorb all or some of the incident solar irradiance. In the instance in which only a part of the solar spectrum is absorbed, the unabsorbed portion of the incident radiation may be transmitted through the exit port at the bottom of the radiant energy spectrum splitter apparatus 100. FIG. 11b shows a rotation-based 3D radiant energy spectrum splitter 100.

Figures 12A, 12B, 12C, 12D:
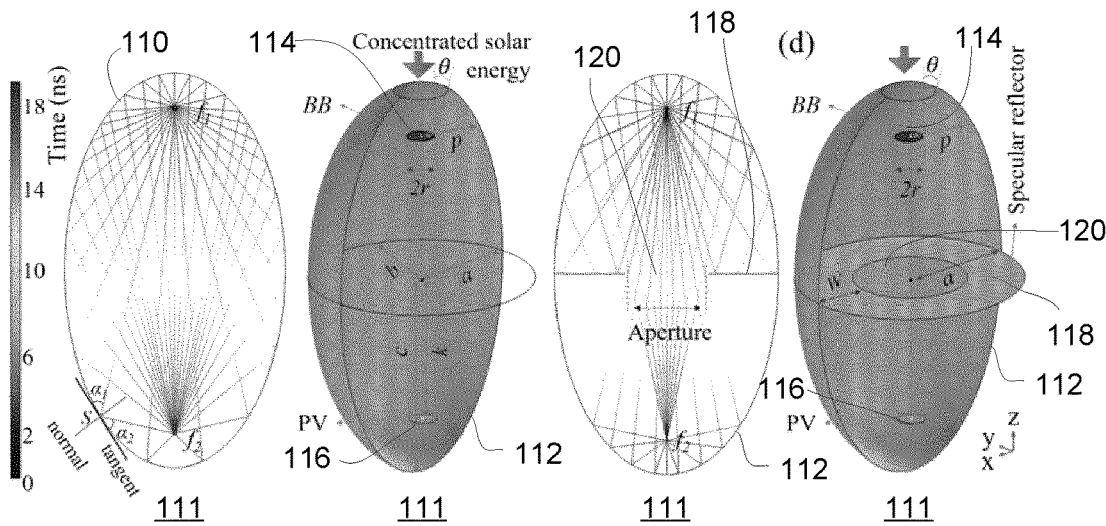
FIG. 12a shows a schematic of an ellipse showing the optical refocusing of light emitted from focal point $f_1$ onto focal point $f_2$.
FIG. 12b shows a prolate spheroid used as an optical cavity to convert concentrated solar radiation for STPV applications.
FIG. 12c shows an addition of an annular specular reflector which can be used to recycle photons back to the emitter at focal point $f_1$.
FIG. 12d shows an annular-shaped aperture placed at the mid-plane of the RESC structure.

FIG. 12a shows a schematic of an ellipse 110 showing the optical refocusing of light emitted from focal point $f_1$ onto focal point $f_2$. FIG. 12b shows a RESC structure 111 comprising prolate spheroid 112 with emitter 114 and absorber 116, such as a photovoltaic cell, used as an optical cavity to convert concentrated solar radiation for STPV applications. FIG. 12c shows an addition of an annular specular reflector 118 with an aperture 120 which can be used to recycle photons back to the emitter 114 at focal point $f_1$. FIG. 12d shows the annular-shaped reflector 118 and the aperture 120 placed at the mid-plane of the RESC structure 111.

Figures 13A, 13B, 13C:
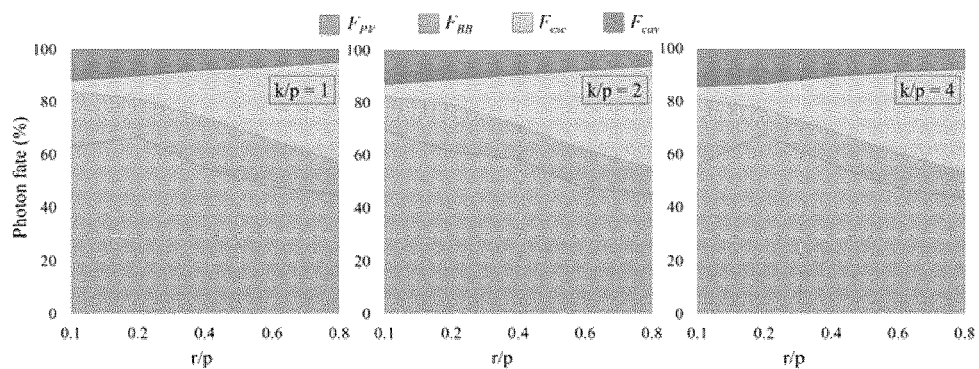
FIG. 13a shows the simulation results of probable fates for photons emitted from the emitter within the RESC structure shown in FIG. 12b as a function of r/p ($r_{pv}=r_{BB}=r$), plotted for the case when k/p=1.
FIG. 13b shows the simulation results of probable fates for photons emitted from the emitter within the RESC structure shown in FIG. 12b as a function of r/p ($r_{pv}=r_{pv}=r_{BB}=r$), plotted for the case when k/p=2.
FIG. 13c shows the simulation results of probable fates for photons emitted from the emitter within the RESC structure shown in FIG. 12b as a function of r/p ($r_{pv}=r_{BB}=r$), plotted for the case when k/p=4.
Figure 14:
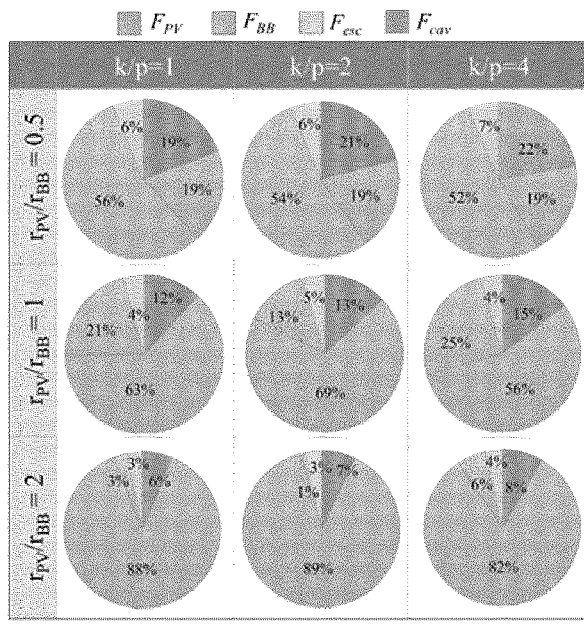
FIG. 14 shows the photon fate probabilities for the cases when $r_{pv}/r_{BB}=1$, $r_{pv}/r_{BB}=0.5$ and $r_{pv}/r_{BB}=2$ for k/p=1, k/p=2, and k/p=4, and $r_{BB}/p=0.1$.

Referring to FIGS. 13a-c, the photons within the RESC structure 111 of a TPV system (or any thermal radiator) undergo different experiences or fates. For example, some photons are absorbed by the PV cell 116 ($F_{PV}$—effective view factor), some photons are returned to and absorbed by a black body (BB) emitter 114 (i.e. photon recycling, $F_{BB}$), some are lost through the top entrance port ($F_{esc}$), and some are absorbed by the cavity walls ($F_{cav}$). The photon fate probabilities are used to calculate the effective emissivity, $\varepsilon^*$, for the emitter 114 within the RESC structures 111 shown in FIGS. 12a-d). Four different photon fates are considered for a TPV system (or any thermal radiator) located in the RESC structure 111. FIGS. 13a-c show the simulation results of probable photon fates for the disc-shaped emitter 114 within the RESC structure 111 shown in FIG. 11b as a function of r/p ($r_{pv}=r_{BB}=r$), plotted for the case when k/p=1, k/p=2, and k/p=4.

The photon fate probabilities for the cases when $r_{pv}/r_{BB}=1$, $r_{pv}/r_{BB}=0.5$ and $r_{pv}/r_{BB}=2$ are shown in FIG. 8. The results shown are for k/p=1, k/p=2, and k/p=4, and $r_{BB}/p=0.1$ for all cases. It can be seen that as $r_{pv}/r_{BB}$ increases the fraction of photons incident onto the PV cell 116 (effective view factor) also increases. As such, the output power from the PV cell 116 is increased if these are in-band photons. However, if the BB 114 temperature is low, and it emits a high percentage of out-of-band photons, the output power from the TPV system can be increased by increasing the degree of photon recycling and therefore the temperature of the BB 114 (T*).

Figures 15A, 15B, 15C:
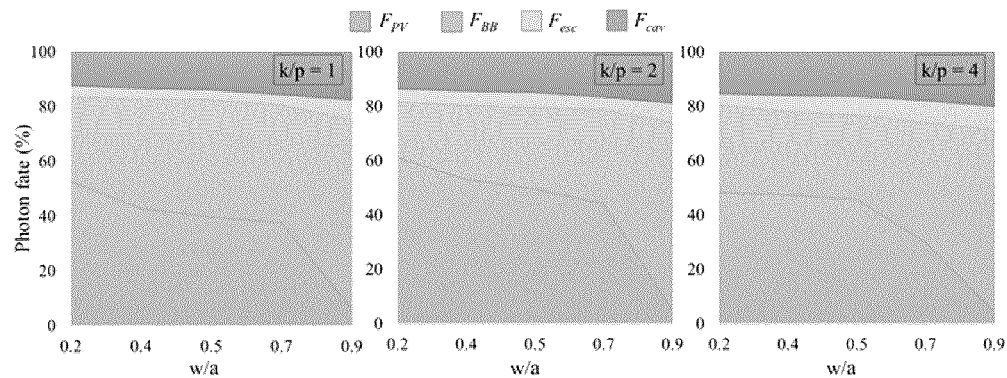
FIG. 15a shows the probable fate of photons emitted from the emitter within the RESC structure shown in FIG. 12d as a function of w/a for the case wherein k/p=1 and r/p is kept constant at 0.1 ($r_{pv}=r_{BB}=r$)
FIG. 15b shows the probable fate of photons emitted from the emitter within the RESC structure shown in FIG. 12d as a function of w/a for the case wherein k/p=2 and r/p is kept constant at 0.1 ($r_{pv}=r_{BB}=r$)
FIG. 15c shows the probable fate of photons emitted from the emitter within the RESC structure shown in FIG. 12d as a function of w/a for the case wherein k/p=4 and r/p is kept constant at 0.1 ($r_{pv}=r_{BB}=r$)

In some situations, such as partial overcast conditions, the temperature of the emitter 114 within the RESC structure 111 may be low, and a higher degree of photon recycling can be used to boost its temperature. To achieve a high degree of photon recycling an annular specular reflector 118 can be placed at the midplane of the RESC structure 111. As shown in FIG. 12c, due to the symmetry of the ellipsoidal cavity, rays emitted from the focal point at $f_1$ that are incident onto the annular specular reflector 118 will be returned to $f_1$. The relative width of the annular specular reflector 118, w/a, can be designed to control the degree of photon recycling (FIG. 12d). The probable fate of photons emitted from the emitter 114 within the RESC structure 111 shown in FIG. 12d are plotted in FIG. 15a-c as a function of w/a for the cases wherein k/p=1, k/p=2, and k/p=4, and r/p is kept constant at 0.1 ($r_{pv}=r_{BB}=r$).

The performance of selected RESC-based STPV systems is compared to that of a hypothetical reference case comprised of a BB emitter 114 and a GaSb PV cell 116 configured as two infinite parallel plates in Table 1. For all cases in Table 1 the solar intensity incident onto the BB emitter 114 is 28 W/cm² (G·C=800 W/m²·350=28 W/cm²).

TABLE 1

Comparison of the performance of selected RESC-based STPV systems at a solar concentration factor of C = 350X.

| | Structure name | | | ε* | Temp. (K) | Effective view factor ($F_{PV}$ %) | In-band photon ($\eta_{inband}$ %) | PV output power den. (W/cm$^2$) | PV cell efficiency ($\eta_{PV}$ %) | System efficiency ($\eta_{TPV}$ %) |
|---|---|---|---|---|---|---|---|---|---|---|
| | No cavity (two parallel infinite plates) | | | 1 | 1253.5 | 50 | 9.33 | 0.67 | 4.76 | 2.38 |
| Prolate Spheroid | $r_{PV}/r_{BB} = 1$ | k/p = 1 | r/p = 0.1 (PS3) | 0.79 | 1329.6 | 62.77 | 11.8 | 0.68 | 6.1 | 4.85 |
| | | | r/p = 0.2 | 0.855 | 1303.6 | 66.6 | 10.93 | 0.62 | 5.7 | 4.41 |
| | | k/p = 2 | r/p = 0.1 | 0.867 | 1298.3 | 69.06 | 10.76 | 0.62 | 5.6 | 4.43 |
| | | | r/p = 0.2 | 0.82 | 1317.8 | 61.28 | 11.4 | 0.62 | 5.9 | 4.41 |
| | | k/p = 4 | r/p = 0.1 | 0.75 | 1346.6 | 56 | 12.37 | 0.665 | 6.4 | 4.75 |
| | $r_{PV}/r_{BB} = 2$ | k/p = 4 | | 0.94 | 1273.1 | 82 | 9.95 | 0.16 | 5.2 | 4.524 |
| | $r_{BB}/p = 0.1$ | k/p = 2 (PS2) | | 0.99 | 1256.7 | 88.7 | 9.43 | 0.155 | 4.9 | 4.42 |
| | | k/p = 1 | | 0.97 | 1262.6 | 87.74 | 9.62 | 0.16 | 5 | 4.54 |
| | $r_{PV}/r_{BB}$ 0.5 | k/p = 1 $r_{BB}/p = 0.1$ (PS1) | | 0.44 | 1537.4 | 18.8 | 19.4 | 2.27 | 9.5 | 4.05 |
| Middle-aperture Prolate Spheroid | $r_{PV}/r_{BB} = 1$ | k/p = 1 | w/b = 0.2 | 0.69 | 1374.2 | 52.45 | 13.34 | 0.727 | 6.85 | 5.19 |
| | | | w/b = 0.5 (PSA1) | 0.573 | 1440.8 | 39.6 | 15.7 | 0.775 | 8 | 5.53 |
| | | | w/b = 0.7 | 0.57 | 1443.3 | 37.4 | 15.8 | 0.74 | 8 | 5.27 |
| | | | w/b = 0.9 | 0.31 | 1677.2 | 6.18 | 24.8 | 0.32 | 11.6 | 2.29 |
| | | k/p = 2 | w/b = 0.2 | 0.795 | 1327.5 | 60.9 | 11.73 | 0.65 | 6.1 | 4.64 |
| | | | w/b = 0.5 | 0.7 | 1370.4 | 49.44 | 13.2 | 0.68 | 6.85 | 4.84 |
| | | | w/b = 0.7 | 0.655 | 1393.4 | 44 | 14 | 0.67 | 7.1 | 4.8 |
| | | | w/b = 0.9 | 0.31 | 1677 | 4.98 | 24.8 | 0.26 | 11.5 | 1.83 |
| | | k/p = 1 | w/b = 0.2 | 0.8836 | 1292.9 | 78.38 | 10.58 | 0.17 | 5.5 | 4.89 |
| | | | w/b = 0.5 | 0.74 | 1352.4 | 62.3 | 12.57 | 0.19 | 6.5 | 5.5 |
| | | | w/b = 0.7 (PSA2) | 0.67 | 1385 | 53.43 | 13.72 | 0.2 | 7.1 | 5.62 |
| | | | w/b = 0.9 | 0.315 | 1673 | 6.9 | 24.6 | 0.09 | 11.55 | 2.53 |
| | | k/p = 2 | w/b = 0.2 | 0.91 | 1283.8 | 79.94 | 10.3 | 0.16 | 5.4 | 4.72 |
| | | | w/b = 0.5 | 0.764 | 1340.8 | 62.37 | 12.2 | 0.18 | 6.3 | 5.14 |
| | | | w/b = 0.7 | 0.68 | 1381.9 | 51.2 | 13.6 | 0.18 | 7 | 5.28 |
| | | | w/b = 0.9 (PSA3) | 0.306 | 1685.4 | 5.5 | 25.1 | 0.074 | 11.7 | 2.1 |

Figure 16A:
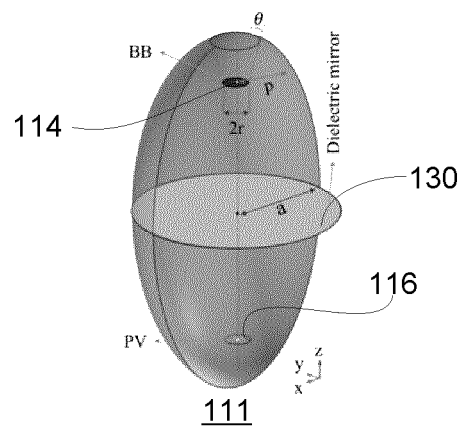
FIG. 16a shows an optical filter, such as a dielectric mirror or a transparent heat mirror, located on the minor axis a within a RESC structure.
Figure 16B:
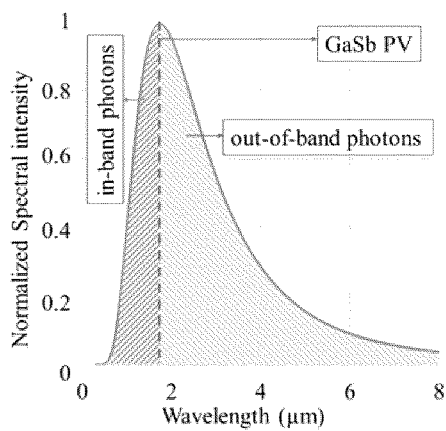
FIG. 16b shows how the filter partitions the radiation from the emitter into in-band photons (transmitted by the filter) and out-of-band photons (reflected by the filter) into recycling and harvesting divisions.
Figure 16C:
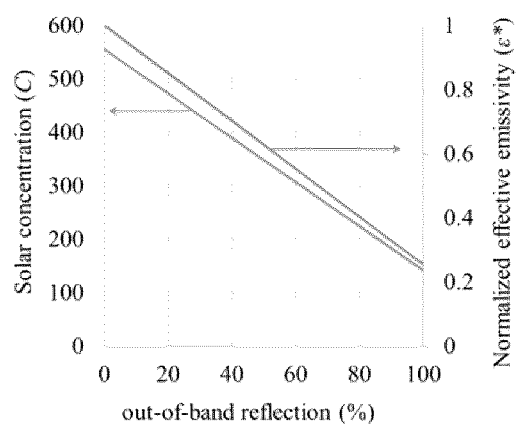
FIG. 16c shows the solar concentration required to maintain a high emitter temperature and the normalized effective emissivity as a function of the percentage of out-of-band photons that are reflected.

FIG. 16a shows an optical filter 130 (dielectric mirror or transparent heat mirror) located on the minor axis a within a RESC structure 111. FIG. 16b shows how the filter 130 partitions the radiation from the emitter 114 into in-band photons (transmitted by the filter) and out-of-band photons (reflected by the filter) into recycling and harvesting divisions. FIG. 16c shows the solar concentration required to maintain a high emitter 114 temperature and the normalized effective emissivity as a function of the percentage of out-of-band photons that are reflected. In-band photons are able to generate current when incident onto the PV cell 116 within the TPV system 111, whereas out-of-band photons are not able to generate current in the PV cell 116.

Figure 17A:
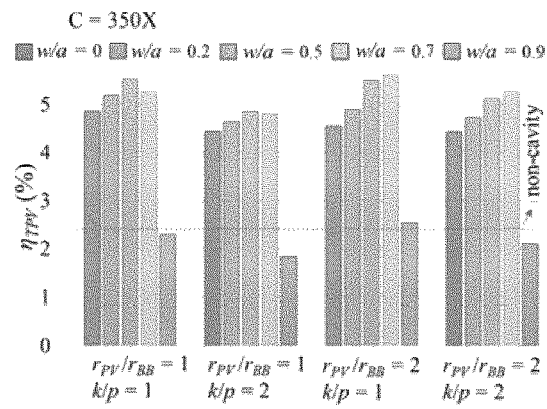
FIG. 17a shows the TPV system efficiency based on the STPV configuration shown in FIGS. 12a-d with different combinations of values for w/a (0, 0.2, 0.5, 0.7, 0.9), $r_{pv}/r_{bb}$ and k/p wherein the solar concentration factor is 350×.
Figure 17B:
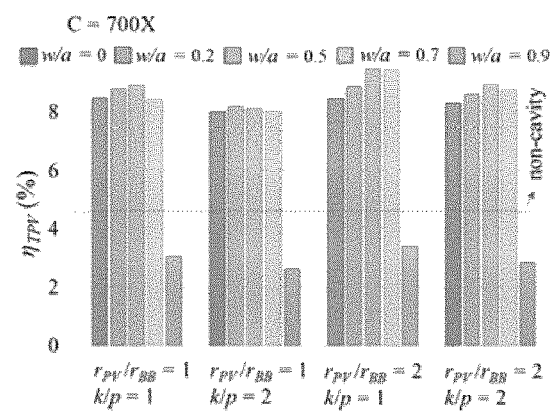
FIG. 17b shows the TPV system efficiency based on the STPV configuration shown in FIGS. 12a-d with different combinations of values for w/a (0, 0.2, 0.5, 0.7, 0.9), $r_{pv}/r_{bb}$ and k/p wherein the solar concentration factor is 700×.
Figure 17C:
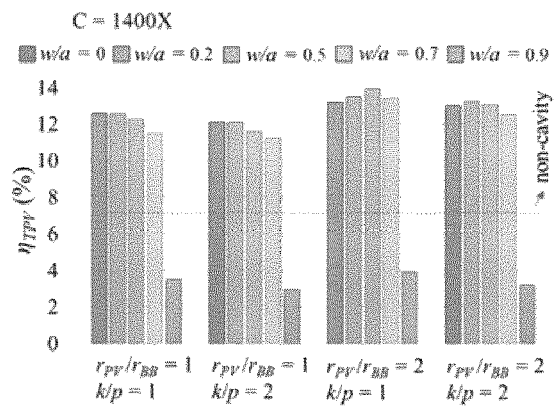
FIG. 17c shows the TPV system efficiency based on the STPV configuration shown in FIGS. 12a-d with different combinations of values for w/a (0, 0.2, 0.5, 0.7, 0.9), $r_{pv}/r_{bb}$ and k/p wherein the solar concentration factor is 1400×.
Figure 17D:
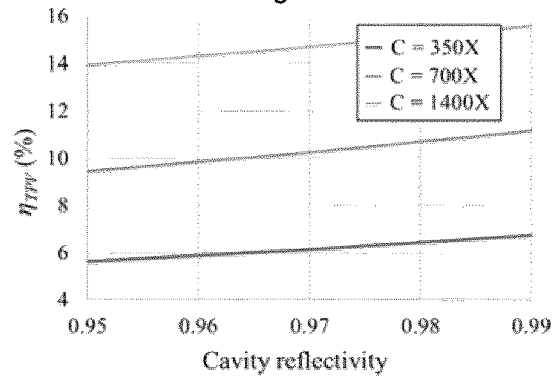
FIG. 17d shows the system efficiency for the best cases at solar concentration factors of 350×, 700×, and 1400× plotted as a function of the specular reflectivity of the ellipsoidal optical cavity for values ranging from 95% to 99%.

The TPV system efficiency, which is based on the STPV configuration shown in FIGS. 12a-d with different combinations of values for w/a (0, 0.2, 0.5, 0.7, 0.9), $r_{pv}/r_{bb}$ and k/p is considered. The results for the cases wherein the solar concentration factor is a) 350×, b) 700×, c) 1400×, are shown in FIGS. 17a-c, respectively, and FIG. 17d shows the system efficiency for the best cases at solar concentration factors of 350×, 700×, and 1400× are plotted as a function of the specular reflectivity of the ellipsoidal optical cavity for values ranging from 95% to 99%.

Figure 18:
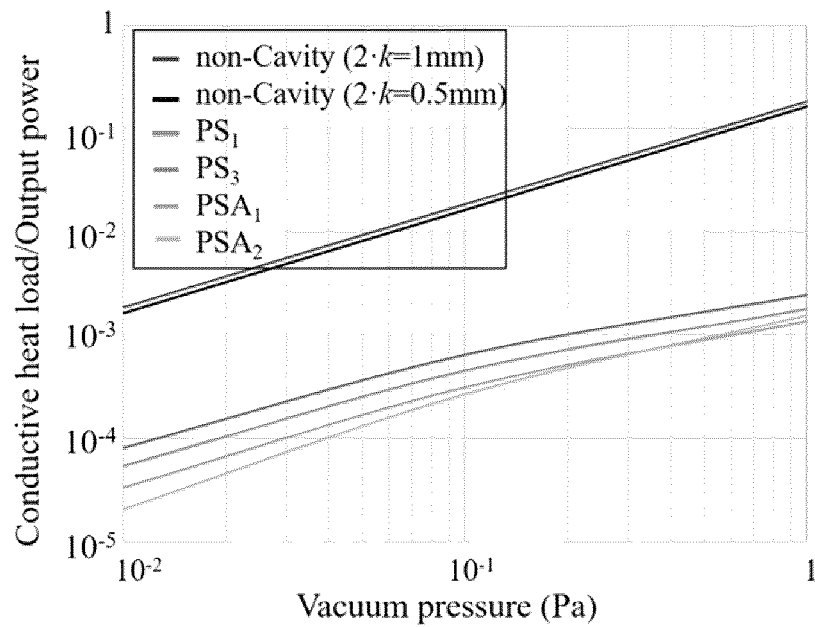
FIG. 18 shows the ratio of the conductive heat load to the generated power for six case studies (shown in the Table 1) plotted as a function of the pressure within the RESC cavity (over the pressure range from 0.01 to 1 Pa)
Figure 19:
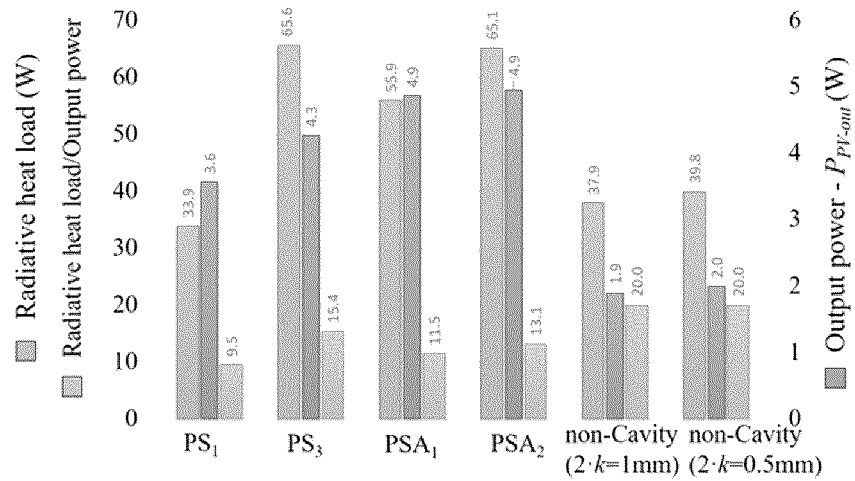
FIG. 19 shows the results of the radiative heat load/power required to keep the temperature of the PV cell at 300K for six case studies shown in the Table 1.

FIG. 18 shows the results of the radiative heat load/power required to keep the temperature of the PV cell 116 at 300K for six case studies shown in the Table 1. In particular, there is shown the ratio of the conductive heat load to the generated power for six case studies (shown in the Table 1) plotted as a function of the pressure within the RESC cavity (over the pressure range from 0.01 to 1 Pa).

The RESC structure 111 based on the ellipsoidal optical cavity may be enhanced to have a higher range of tunability over the photon recycling ($F_{BB}$ or $BB_{abs}$) or the energy delivered to the PV cell 116 (view factor-$F_{PV}$ or $PV_{abs}$). In one example, a prolate spheroid cut in half through its minor axis is situated on top of the initial prolate spheroid such that their focal points are shared.

Figure 20A:
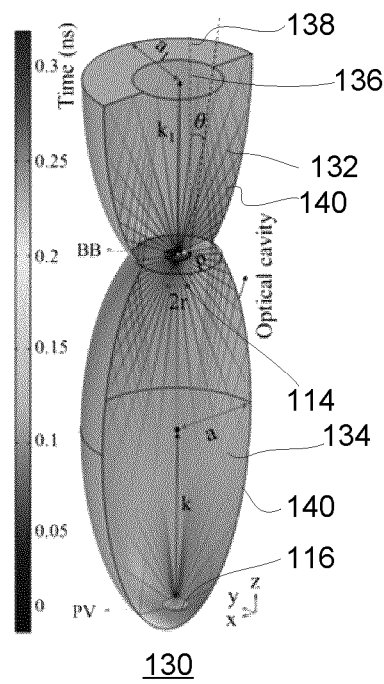
FIG. 20a shows a RESC structure comprising a prolate hemispheroid and a prolate spheroid.
Figure 20B:
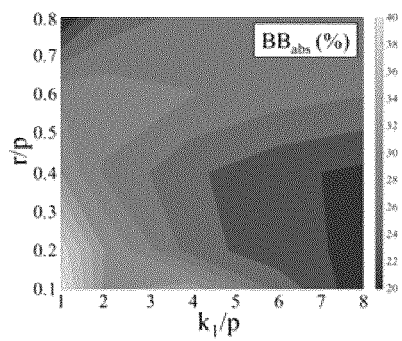
Figure 20C:
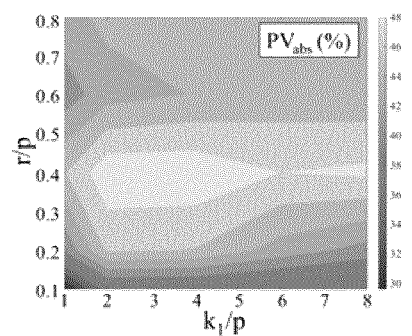
Figure 20D:
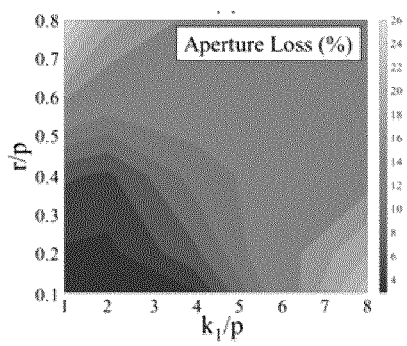
Figure 20E:
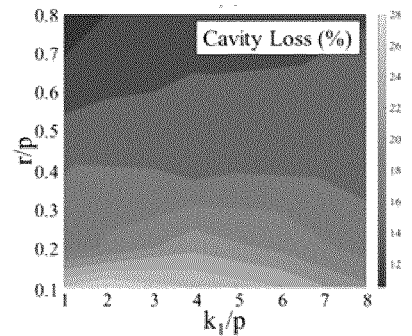

FIG. 20a shows a RESC structure 130 comprising a prolate hemispheroid 132 and prolate spheroid 134, including emitter 114 and PV cell 116, in which the prolate hemispheroid 132 and prolate spheroid 134 share a focal point. The photon fate for this prolate hemispheroid-prolate spheroid—shared focal point RESC structure 130 is shown in the FIGS. 20b-e. Photons radiated from the emitter 114 may be reflected and returned to the emitter 114 ($F_{BB}$ or $BB_{abs}$), incident onto the PV cell 116 ($F_{PV}$ or $PV_{abs}$), lost through an opening 136 at the top 138 of the RESC structure 130 (Aperture Loss) or absorbed by the cavity walls 140 (Cavity Loss).

In another example, the RESC structure 111 of FIG. 12b may be further enhanced by combining a prolate spheroid and oblate spheroid. Exemplary key parameters to achieve an efficient optical cavity include having an optical cavity with very high specular reflectivity for the reflecting surface (e.g. 95% using a polished aluminum surface, or 99% using a gold coating) and also selecting a geometry or structure which is able to reflect the thermal emission from the emitter 114 with a minimum number of reflections. Generally, due to non-ideal reflectivity of the optical cavity, each additional reflection increases the losses and degrades the performance of the TPV system. For the above-mentioned structures (prolate spheroid cavity, prolate spheroid cavity with middle aperture, and prolate spheroid cavity combined with a prolate hemispheroid cavity with shared focal points) the number of reflections that radiated photons undergo before converging onto the PV cell 116 or being recycled at the emitter 114 is important because some energy is lost (through absorption) each time a ray is reflected. If the absorber 116/emitter 114 and the PV cell 116 were infinitesimal points situated on the focal points of the ellipsoid, rays emitted from the thermal emitter 114 would either converge to the PV cell 116 or the emitter/absorber 114 after a minimum number of reflections. For the RESC structure 111 shown in FIG. 12b the maximum number of reflections is 1; for the RESC structures 111 shown in FIGS. 12d, 16a and 20a the maximum number of reflections is 2, which includes the possibility of the reflection off of the middle aperture or the filter. However, in reality the absorber/emitter 114 and the PV cell 116 have some finite width and the emitted rays may be reflected multiple times before being recycled by the absorber or converging to the PV cell 116. The number of reflections in the cavity may be further minimized, as described below with reference to the RESC structure 140 shown in FIG. 21a.

Figure 21A:
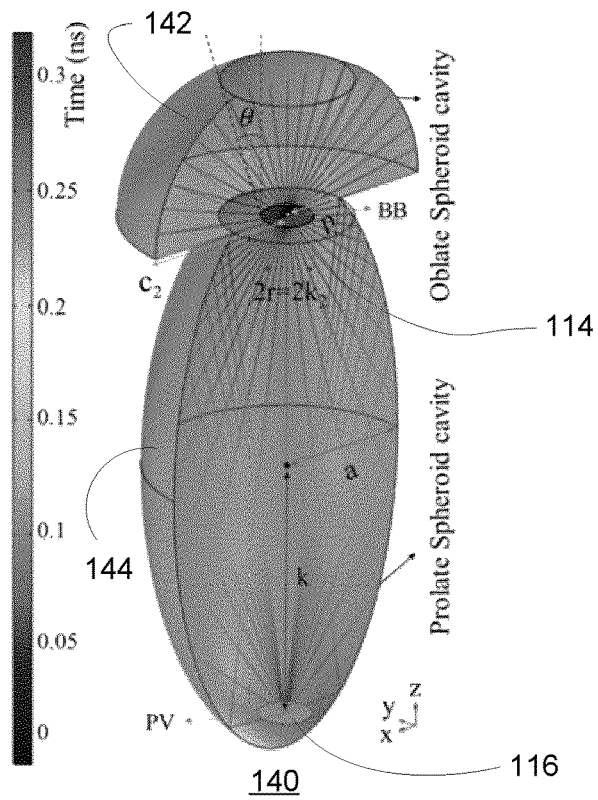
FIG. 21a shows the structure of a oblate spheroid cut through the major axis and situated on top of a prolate spheroid.

Better performance can be achieved by using an oblate spheroid, instead of a hemispheroid of FIG. 20a, in order to contain the radiation emitted in the upward direction. For example, FIG. 21a shows a RESC structure 140 comprising an oblate spheroid 142 at the top side and a prolate spheroid 144 at the lower side. The oblate spheroid 142 is cut through the major axis and situated on top of the prolate spheroid 144 in a way that the upper focal point of the prolate spheroid 144 is situated on the center of the oblate spheroid 142, and the emitter/absorber 114 is expanded through the focal points of oblate hemispheroid 142. Accordingly, the photon recycling and view factor may be effectively controlled, and the oblate spheroid 142 focal point is shared with the focal point of the prolate spheroid 144. If the emitter/absorber 114 were an infinitesimal point, the half of the rays emitted toward the top side would be directed back to the emitter 114 after only one reflection from the optical cavity. However, in reality the absorber/emitter 114 has some finite width and radiation emitted at large angles can be reflect multiple times before returning to the absorber. Due to non-ideal reflectivity of the optical cavity, each additional reflection degrades the performance of the TPV system.

Figure 22:
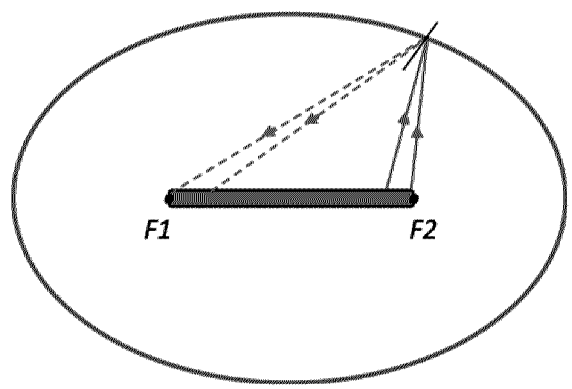
FIG. 22 shows an emitter placed along the foci of the ellipsoid.

As mentioned in Weinstein L A. "Improvements to solar thermoelectric generators through device design" (Doctoral dissertation, Massachusetts Institute of Technology), the emitter 114 can be placed along the foci of the ellipsoid as shown in FIG. 22. The foci span the distance between the two focal points. Assuming specular refection at the inner walls of the ellipsoid, any photons emitted from a point along the foci will be reflected back to the foci (unless the photons are absorbed by the ellipsoid walls).

Therefore, by situating an oblate spheroid cavity 142 on top of the prolate spheroid cavity 144 and spanning the emitter 114 between the focal points, the emission from the emitter 114 toward the top side (z-axis) is reflected back to the emitter 114 after only one reflection. According to equation (3) The absorber radius ($r_{abs}$) should set by:

$$r_{abs} = \sqrt{a^2 - c^2} \quad (4)$$

Figure 21B:
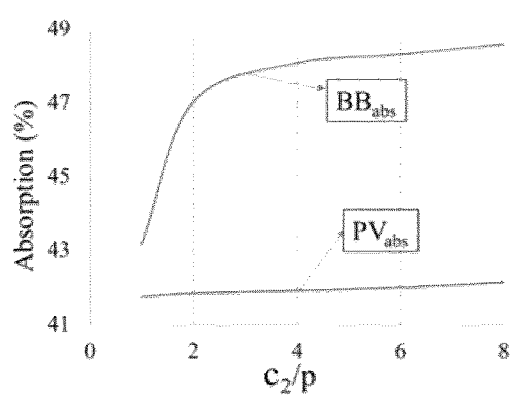
FIG. 21b shows the photon fate (absorption (%)) for the hemi-oblate-spheroid/prolate-shared-focal-point RESC structure as a function of $c_2/p$.
Figure 21C:
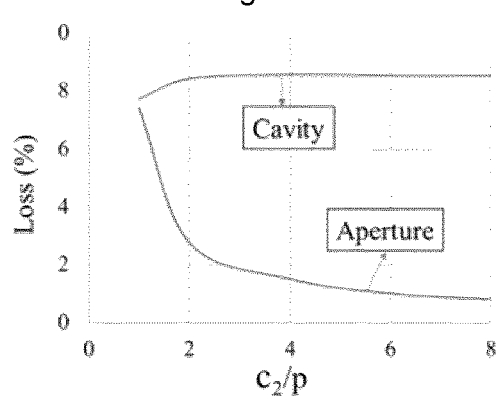
FIG. 21c shows the photon fate (loss %) for the hemi-oblate-spheroid/prolate-shared-focal-point RESC structure as a function of $c_2/p$.

FIGS. 21b and 21c show the photon fate for the hemi-oblate-spheroid/prolate-shared-focal-point RESC structure 140 as a function of $c_2/p$.

Figure 23A:
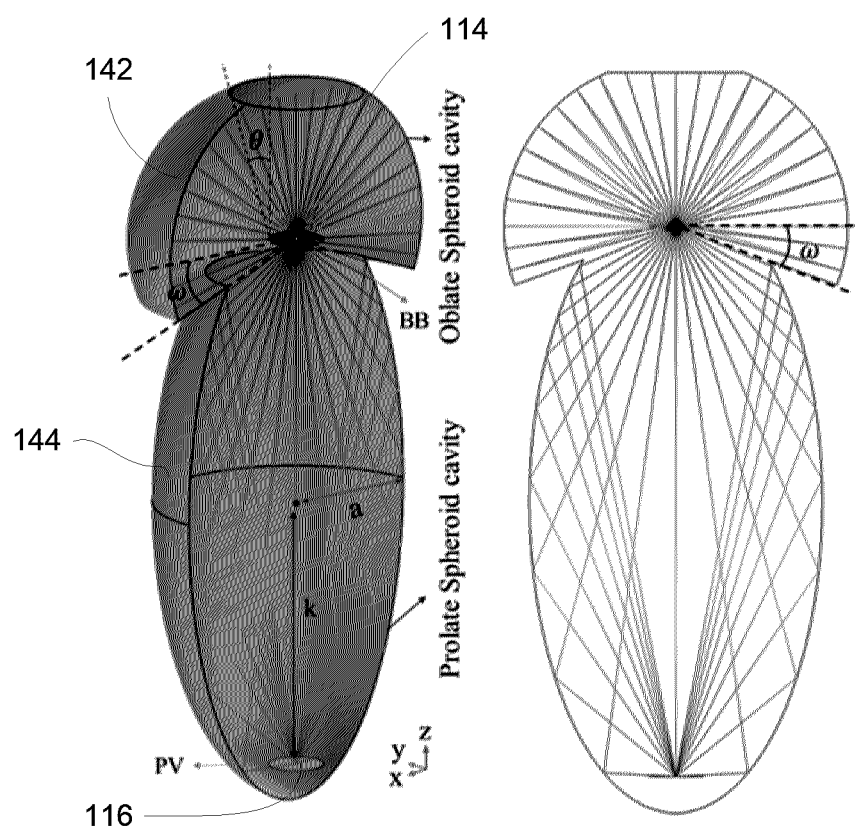
FIG. 23a shows an upper oblate spheroid with recycling angle (ω)
Figure 23B:
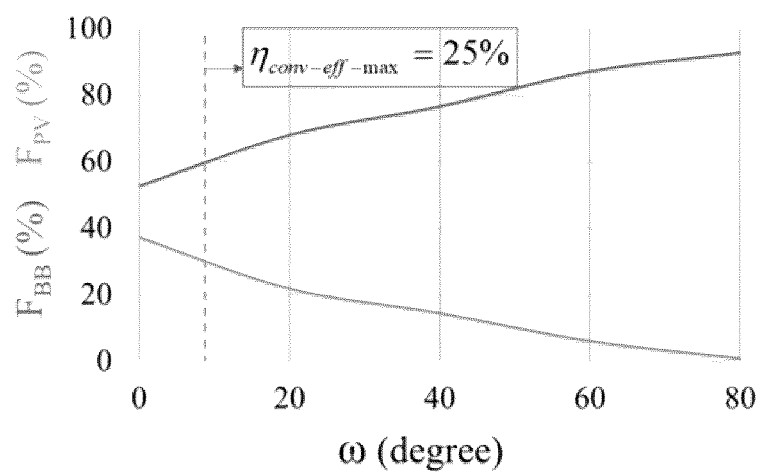
FIG. 23b shows the effect of the recycling angle (ω) as a function of co from 0 to 80°.

As shown in FIG. 23a, the upper oblate spheroid 142 can be extended as defined by omega ($\omega$), referred to as the recycling angle. The recycling angle may be used to tune the trade-off between the view factor and the number of recycled photons. As the recycling angle ($\omega$) increases, the view factor between the emitter 114 and the PV cell 116 decreases, and less photons are incident onto the PV cell 116. However, the benefit of increasing the recycling angle ($\omega$) is that more photons are recycled, and the emitter temperature can be increased. The recycling angle ($\omega$) has an optimum value at which the number of in-band photons incident onto the PV cell 116 is maximized.

FIG. 22b shows the effect of recycling angle ($\omega$) as a function of $\omega$ from 0 to 80°. As expected, when the recycling angle increases, the effective view factor between the PV cell 116 and the emitter decreases and the recycling factor increases. FIG. 22b shows the photon fate for the recycling photons ($F_{bb}$ or $BB_{abs}$) and the view factor ($F_{PV}$ or $PV_{abs}$) as a function of co. This STPV system can achieve a maximum conversion efficiency of ~25% at 9 degrees of recycling angle ($\omega$), 95% of reflectivity of the optical cavity and 1400× of solar concentration.

When the solar concentration factor is 1400×, the reflectivity of the cavity is 95%, this STPV system can achieve a maximum conversion efficiency of approximately 25% at the recycling angle of 9 degrees. This efficiency has been achieved without using selective emitters, optical filters, or composites, or structured or multilayer materials which increase system complexity.

In other exemplary implementations, selective emitters and filters can be added to further increase efficiencies.

In other exemplary implementations, the spheroids of the RESC structures comprise shared focal points and are designed to effectively decrease the above-mentioned loss mechanisms, and are associated with numerous advantages. For example, RESC structures for Solar TPV (STPV) applications, in comparison to other STPVs, are capable of generating power using relatively low values of solar concentration. Generally, in "planar" STPV systems, a high ratio between the area of the emitter and the area of the absorber (~5 to 30 times) results in a reasonable efficiency. This ratio has been identified as a fundamental challenge in designing efficient STPV systems. Although a large ratio between the area of the emitter and absorber is needed to achieve high efficiencies (by avoiding high emission losses) a very high level of solar concentration is required to keep the temperature of the absorber/emitter high. The reason for this is that when the area ratio is high, the emitting area is also large, and the absorber must receive more incoming energy from the sun to keep the temperature of the emitter high. Accordingly, having a small emitter/absorber area ratio in comparison to other STPV systems may be an important advantage.

Yet another advantage of these RESC structures is the dual-functionality (dual-application) of the absorber as it works as the emitter as well. For example, a large portion of the rays emitted from the absorber surface is delivered to the PV cell 116, such that the absorber is a part of the emitter as well, which results in either a high level of view factor or photon recycling.

Furthermore, these RESC structures allows for tunability of the degree of photon recycling and view factor by changing the PV cell-to-emitter area ratio, or by placing an annular-shaped aperture at the mid-plane of the RESC structure, as shown in FIG. 6d, or by adding an oblate or prolate spheroid at the top of the RESC structure. The added oblate or prolate spheroid shares the same focal point.

Another advantage is that the RESC structure configuration enables a large separation distance between the PV cell 116 and the emitter while maintaining a large view factor. This feature permits the PV cell 116 to be brought out of the vacuum enclosure which allows for a better cooling system to be designed for the PV cell 116.

Yet another advantage of these RESC structures is that the area of the PV cell 116 may be made to be very small, which results in a high-power density and is cost effective, especially given that PV cells 116 used in TPV systems are general relatively expensive. Lastly, the STPV system described herein is based on robust components that can withstand high temperatures.

Most of the above-mentioned advantages may also be apparent in most TPV systems and applications. However, in non-STPV applications, in which the heat source comes from burning fuels or waste heat or other sources, there is no absorber surface, and the cavity may not have a top opening, therefore, the cavity loss reduces to only the non-ideal reflectivity of the inner surface of the optical cavity. In non-STPV applications the optical cavity still brings a high degree of design freedoms to tune the photon recycling or view factor. The last four advantages listed above are valid for the non-STPV applications.

In another implementation, the receiver/absorber may be replaced with a flame, a combustion or exhaust system, to provide more radiation that can be converted to electricity in the PV cell at the second focal point of the apparatus 10, which results in advantages of the spectrum converter apparatus 10 such as: smaller size of attached PV device; longer distance between receiver/absorber and the TPV; and thermal energy recycling of the heat source.

In another implementation, the solar spectrum converter apparatus 10 comprises a spheroidal shaped element.

In another implementation, the solar spectrum converter apparatus 10 comprises only a single hemi-ellipsoidal shaped element, or a single hemi-spheroidal shaped element, or a single-hemi paraboloidal shaped element.

In another implementation, the solar spectrum converter apparatus 10 comprises only a portion of an ellipsoidal shaped element, or a portion of the spheroidal shaped element, or a portion of a paraboloidal shaped element, or any combination thereof.

The benefits and advantages described above may relate to one embodiment or may relate to several embodiments. The embodiments are not limited to those that solve any or all of the stated problems or those that have any or all of the stated benefits and advantages. The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A radiant energy spectrum converter comprising:
    a prolate hemi-spheroid optical cavity combined at a meeting point with at least a prolate spheroid optical cavity and an oblate hemi-spheroid optical cavity;
    an emitter located at the meeting point, wherein the emitter is operable to emit photons; and
    a photovoltaic cell to receive the photons for generating an electric current in the photovoltaic cell; and wherein the photovoltaic cell is located at one end of the prolate spheroid optical cavity.

2. The radiant energy spectrum converter of claim 1, wherein the prolate spheroid optical cavity and the prolate hemi-spheroid optical cavity have shared focal points.

3. The radiant energy spectrum converter of claim 1, wherein a photovoltaic cell-to-emitter area ratio comprises a range to permit tunability of a degree of photon recycling and a view factor, and the view factor is dependent on at least one of the emitter's radius and the photovoltaic cell's radius.

4. The radiant energy spectrum converter of claim 3, wherein the oblate hemi-spheroid optical cavity is stacked above the prolate spheroid optical cavity.

5. The radiant energy spectrum converter of claim 4, wherein the emitted photons from the emitter toward walls of the oblate hemi-spheroid optical cavity are reflected back to the emitter after only one reflection.

6. The radiant energy spectrum converter of claim 5, wherein the oblate hemi-spheroid optical cavity is extended as defined by a recycling angle ($\omega$), wherein the recycling angle ($\omega$) can is used to tune a trade-off between a view factor and a number of recycled photons.

7. The radiant energy spectrum converter of claim 6, wherein increasing the recycling angle ($\omega$) decreases the view factor between the emitter and the photovoltaic cell, and less photons are incident onto the photovoltaic cell.

8. The radiant energy spectrum converter of claim 7, wherein a planar selective mirror is located along a minor-semi axis of the prolate hemi-spheroid optical cavity.

9. The radiant energy spectrum converter of claim 8, wherein the planar selective mirror is a spectrally reflective Bragg reflector.

10. The radiant energy spectrum converter of claim 1, wherein a degree of photon recycling and a view factor is tunable via at least one of a photovoltaic cell-to-emitter area ratio comprising a range, an annular-shaped aperture placed at a mid-plane of the prolate spheroid optical cavity, and a size of an entrance aperture at a top of the oblate hemi-spheroid optical cavity.

* * * * *